United States Patent
Schuda et al.

(10) Patent No.: US 6,315,060 B1
(45) Date of Patent: Nov. 13, 2001

(54) COLLET ASSEMBLY FOR POWER TOOLS

(75) Inventors: David J. Schuda, Lombard; Barbara Perozek, Evanston; David Iverson, Chicago, all of IL (US)

(73) Assignee: Wilton Tool Company, LLC, Palatine, IL (US)

( * ) Notice: Subject to any disclaimer, the term of this patent is extended or adjusted under 35 U.S.C. 154(b) by 0 days.

(21) Appl. No.: 09/475,370

(22) Filed: Dec. 30, 1999

Related U.S. Application Data

(63) Continuation-in-part of application No. 09/387,714, filed on Aug. 13, 1999.

(51) Int. Cl.[7] .................................................. B23B 31/107
(52) U.S. Cl. ..................... 173/132; 173/115; 173/210; 173/216; 408/239 R; 279/79; 279/23.1; 279/906
(58) Field of Search ........................ 173/48, 47, 115, 173/210, 132, 216, 217; 279/19.4–19.7, 23.1, 76, 79, 80, 82, 906; 408/239 R; 403/321, 326–29

(56) References Cited

U.S. PATENT DOCUMENTS

| | | | |
|---|---|---|---|
| 943,863 | * | 12/1909 | Clouse ................................. 279/79 |
| 1,052,077 | * | 2/1913 | McMillan ............................. 279/79 |
| 1,076,971 | * | 10/1913 | Geiger ................................. 279/80 |
| 1,938,860 | * | 12/1933 | Renfer ................................. 279/79 |
| 2,704,681 | * | 3/1955 | Fischer ............................... 279/906 |
| 3,123,370 | * | 3/1964 | Unander ............................... 279/82 |
| 4,385,854 | * | 5/1983 | Miyakawa ........................... 279/906 |
| 4,645,015 | * | 2/1987 | Mitchell ............................. 173/115 |
| 4,692,073 | * | 9/1987 | Martindell ............................ 279/80 |
| 4,787,278 | * | 11/1988 | Bononi ................................. 279/79 |
| 5,221,154 | * | 6/1993 | Foulquier et al. .................. 403/326 |
| 5,481,949 | * | 1/1996 | Yen ..................................... 279/79 |
| 5,722,805 | * | 3/1998 | Giffin ............................. 408/239 R |
| 5,826,888 | * | 10/1998 | Weaver et al. ..................... 279/23.1 |
| 6,053,675 | * | 4/2000 | Holland et al. .................. 408/239 R |

* cited by examiner

*Primary Examiner*—Scott A. Smith
(74) *Attorney, Agent, or Firm*—Fitch, Even, Tabin & Flannery

(57) ABSTRACT

A collet assembly is provided that securely holds tool bit shafts therein while allowing them to be readily and easily interchanged. The collet assembly herein has a very few number of parts and is easily assembled without the need for any special tools or machines therefor. In a preferred form, the collet assembly provides for release of the tool shaft by a forward sliding action of a collet sleeve. In this manner, rearward forces acting on the sleeve in an axial direction such as can occur during tool operations will not cause the tool shaft to be accidentally released. Another advantage is the use of a retaining member for releasably holding the shaft. The retaining member avoids the use of detent balls as in prior collets which can require ramp surfaces formed to very precise tolerances to engage and shift the balls into and out of a holding position on the shaft.

14 Claims, 15 Drawing Sheets

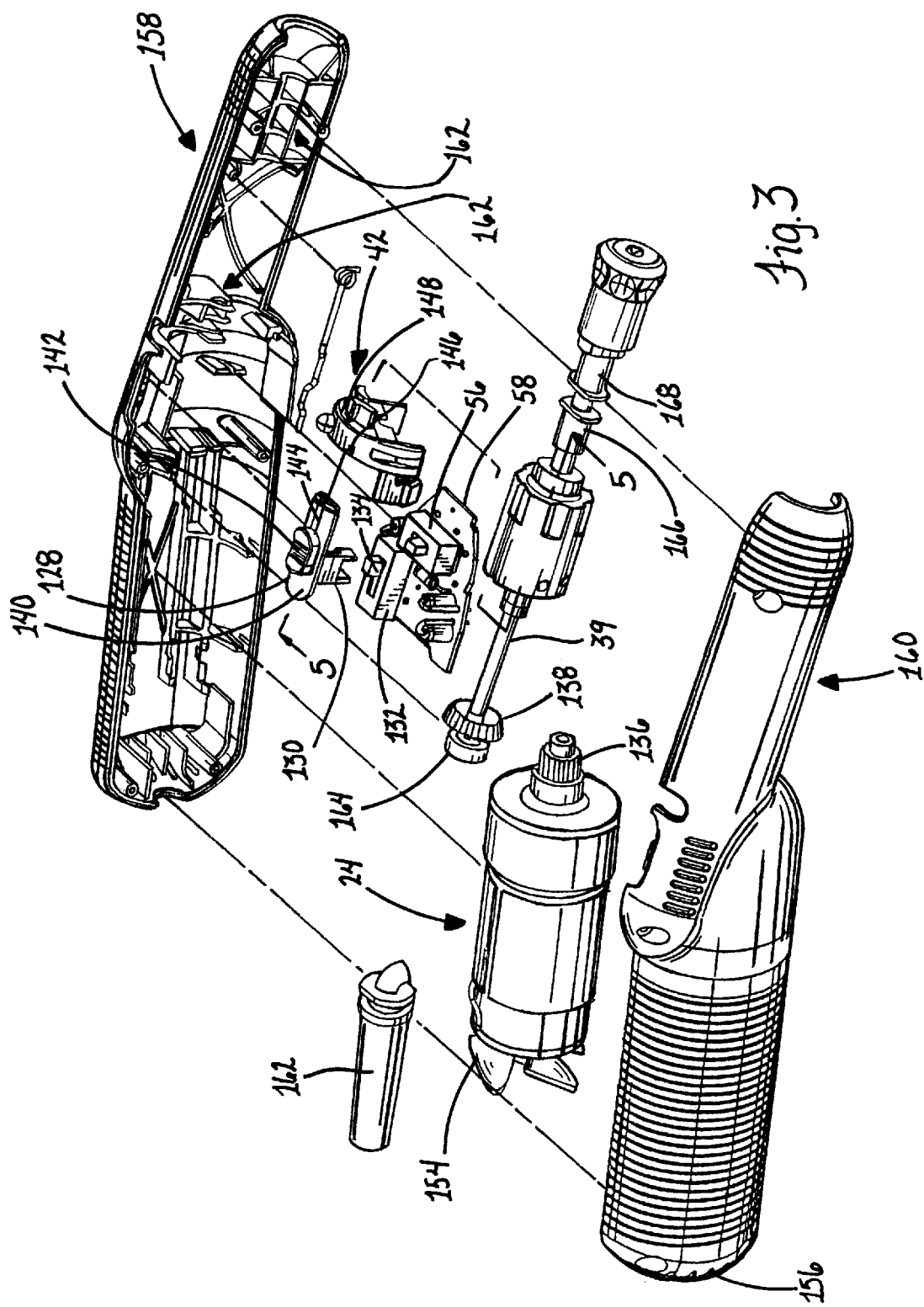

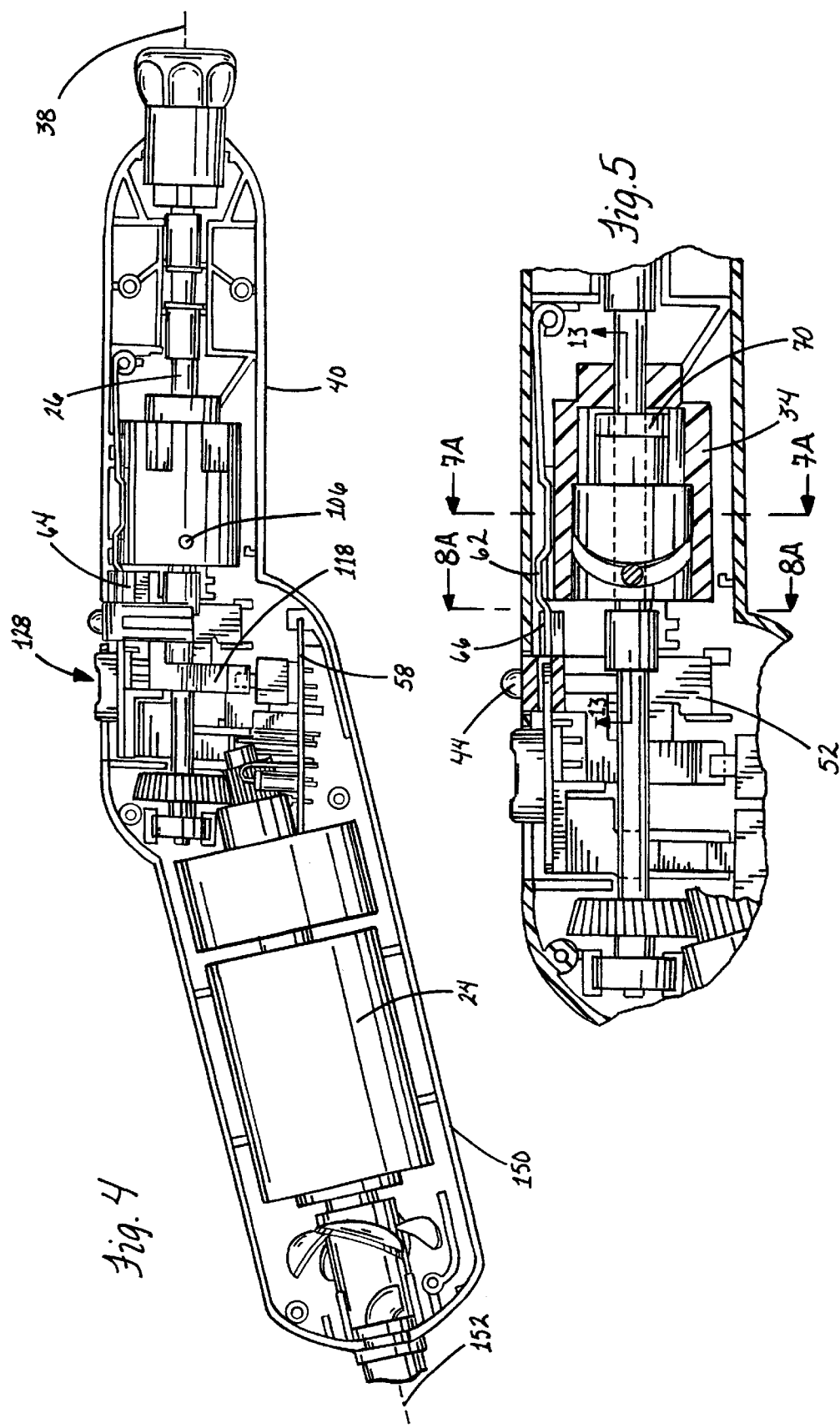

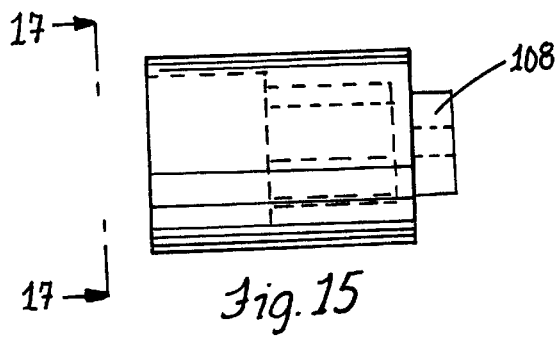
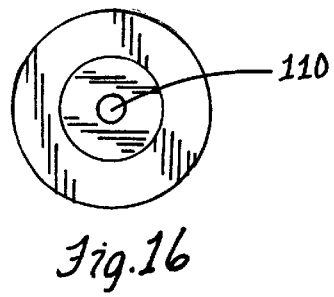
Fig. 15
Fig. 16
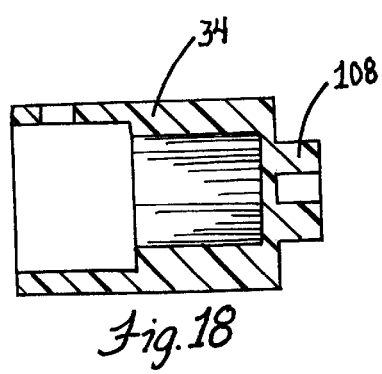
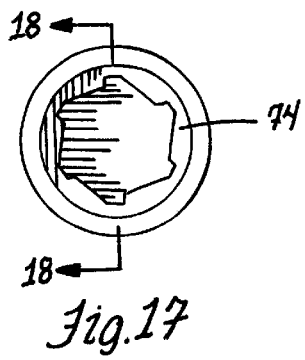
Fig. 18
Fig. 17
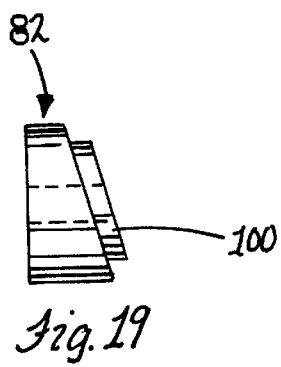
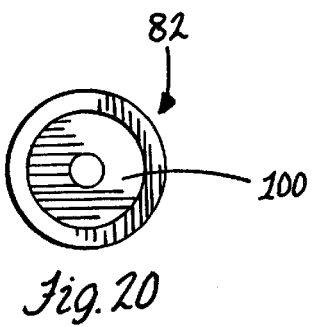
Fig. 19
Fig. 20
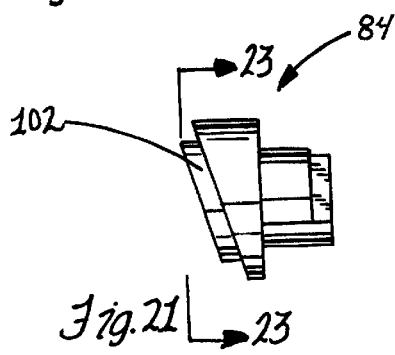
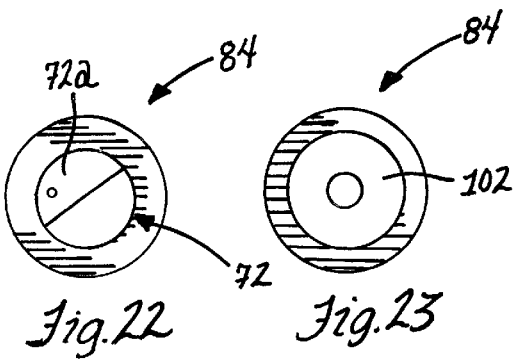
Fig. 21
Fig. 22
Fig. 23

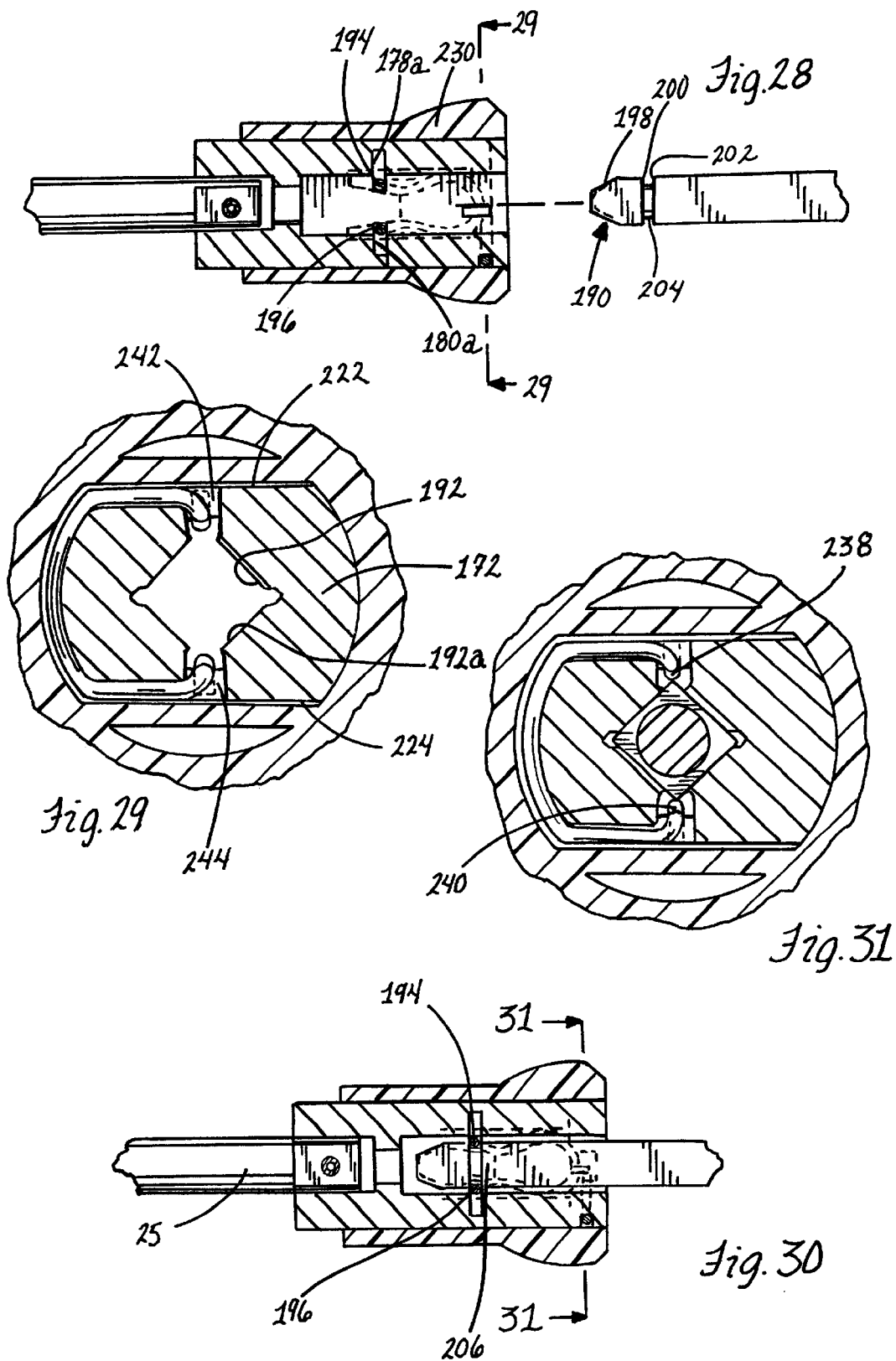

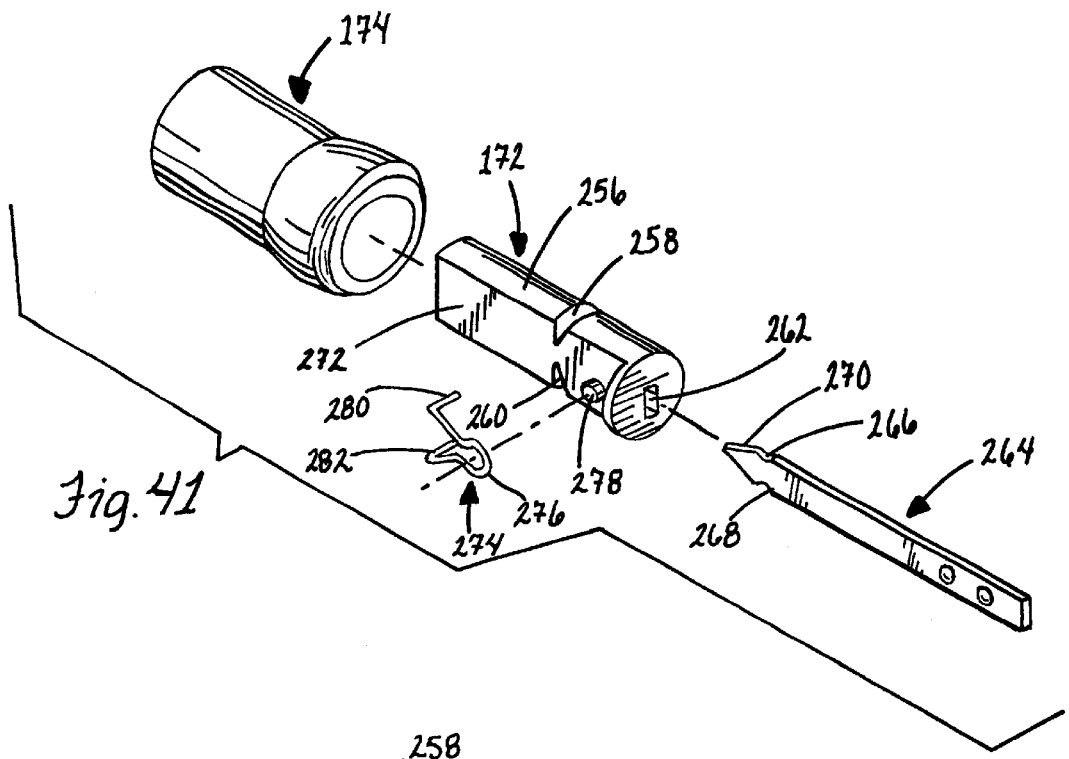
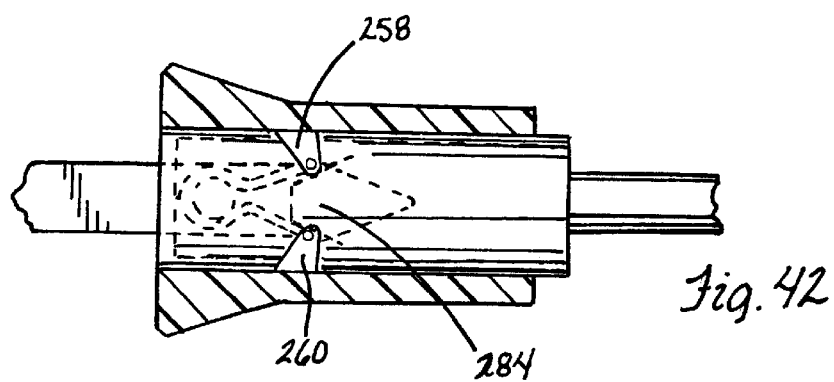
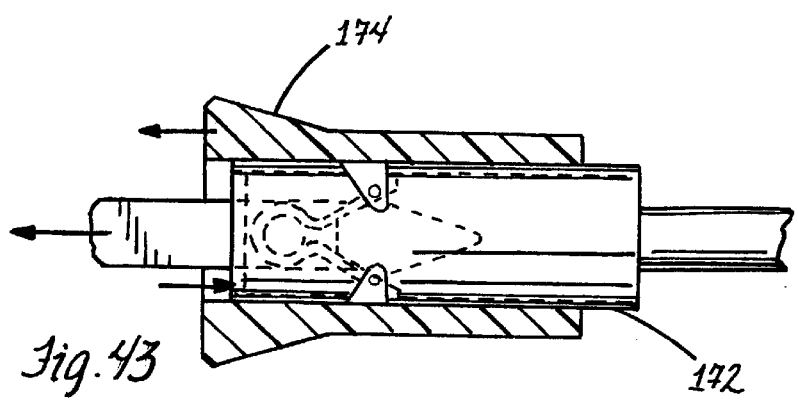

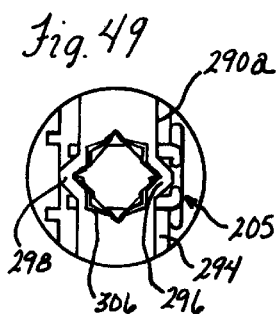
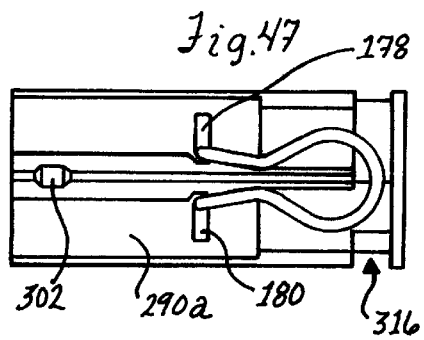
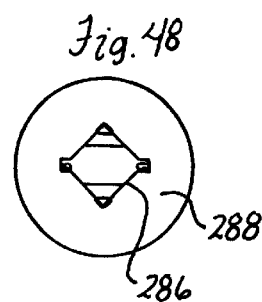
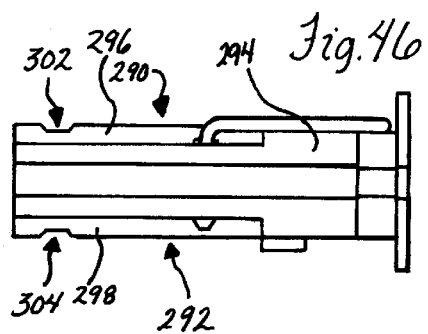
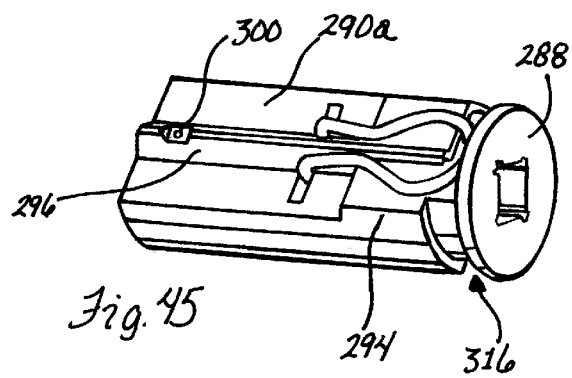

COLLET ASSEMBLY FOR POWER TOOLS

This is a continuation-in-part, of prior application Ser. No. 09/387,714, filed Aug. 13, 1999, pending, which is hereby incorporated herein by reference in its entirety.

FIELD OF THE INVENTION

The invention relates to a collet assembly and, more particularly, to retaining members for use with collet assemblies.

BACKGROUND OF THE INVENTION

There is a need for a hand-held power tool that has the capability to clean surfaces, such as by brushing and buffing, which may otherwise be difficult to effectively clean, such as on automobiles, particularly in their interiors. Although in one form a cleaning tool is described, it should be noted the applications for the power tool herein are more broad based. There are a variety of household and hobby uses to which the present tool can be put such as: sanding, filing, sawing, brushing, polishing, dusting, scraping, wood carving, and cutting.

Automobile owners generally clean the exterior surfaces of their cars on a fairly regular basis either themselves or by running their car through an automatic carwash such as at gasoline stations. These automatic carwashes utilize high pressure jets of cleaning solution sprayed at the cars as they are run through the carwash and have rotating apparatuses carrying rag-type cleaning elements and/or brush bristles which are moved to a position adjacent the car so as to contact the car's exterior surface as they are rotated. While these carwashes are quick, they are generally no substitute for a manual detailing of the car's surfaces, especially those surfaces which can be buffed to a high shine such as chrome and other metallic surfaces and those surfaces which are hard to access such a between parts. Automated carwashes typically do not have the capacity for such specified cleaning and can not approach the cleaning job obtained through a manual detailing where a person can apply precise pressure to difficult-to-clean spots, such as where there is dirt build-up and can buff specific surfaces until they are shined sufficiently.

With respect to the car's interior surfaces, particularly those that are difficult to access, such as the surfaces on and around the doors, dashboard and steering column, these surfaces are subject to cleaning on a much more infrequent basis than the car's exterior and are generally only cleaned when a car is taken in to be detailed at a full-service carwash after an automated washing of the car's exterior. As molding techniques for producing car parts have become more advanced, these interior parts have correspondingly taken on a wider variety of shapes and configurations which can make them more difficult to access and clean. Because of the lack of regular cleaning, these surfaces can get fairly dirty with grime and dust which builds up over lengthy periods of time. In order to clean these surfaces, workers at full-service carwashes generally use a wide variety of different types of cleaning solutions applied to the surfaces designed to cut through the dirt buildup thereon with the surfaces being wiped down by brushes, rags and the like. As with the exterior detailing, to ensure a good cleaning job for these surfaces, the rags or other cleaning elements must be wiped against the surface with a certain amount of pressure so as to remove the dirt buildup thereon. Where the surfaces are difficult to access, it is also difficult for a worker to obtain the proper leverage to apply the pressure required to ensure a thorough cleaning of the surface. Oftentimes, the workers will open the car door when cleaning the car's interior surfaces and position themselves so their legs are on the ground outside the car while they clean the underneath surfaces on and near the dashboard and steering column areas in the car so as to be able to gain the leverage to exert the pressure required on these surfaces for removing the accumulated dirt thereon. As carwashes can be high volume facilities where workers are driving cars to various locations thereabout, the requirement that workers position themselves partially outside the car to clean car interior surfaces can present a potentially hazardous situation.

As is apparent from the above, cleaning and detailing the surfaces of a car is a difficult and laborious task which may explain why car owners do not often perform this task themselves, or at least on a more regular basis as with each washing of the car exterior. It also explains the presence of such detailing facilities as car owners would rather pay someone else the money to detail their car rather than exert the time and effort required if they were to do it themselves. Such non-automated detailing can be fairly expensive, particularly if one desires to keep their car detailed on a regular basis. Thus, there is a need for a hand-held power tool which can be used to clean and buff surfaces, such as on a car. It would be desirable for the power tool to have a working element which can be rotated or reciprocated such as against a surface to be cleaned so as to provide the tool with greater flexibility such as in cleaning surfaces having different orientations and various configurations and which otherwise would be difficult to effectively clean either manually or in an automatic carwash.

In prior tools that have dual modes for providing the working element with different types of motions, the transmission between the motor and working element typically is very complicated using a large number of force transmitting components, i.e. gears, shafts, cams and levers. In many hand-held power tools manufacturing and assembly costs are very important, particularly where the tool is for retail sale such as to the do-it-yourself market. In this regard, the complicated transmissions of prior tools in this area do not lend themselves to low cost manufacture and assembly. In addition, their large number of components can make assembly thereof difficult and complex.

Another shortcoming is that generally these complicated transmissions require more space for their components making the tool larger than desirable for hand-held operations. For example, where counter-shafting is utilized, the housing for the tool has to provide sufficient space in the lateral direction for the primary and secondary shafts and rotating components that may be mounted thereon.

The collet design is another important feature in power tools. Again, many prior collets utilize a large number of parts which undesirably raises complexity and costs associated with their manufacture and assembly. In prior collets the use of detent balls that cooperate with precisely formed grooves in pilot shafts of the bits is commonplace. With detent balls, ramp surfaces on the collet and/or shaft are typically provided to allow the shaft to be releasably held by the collet. These ramp surfaces have to be formed to very exacting tolerances to achieve secure mounting of the shaft in the collet during tool operation while also allowing the shaft to release from the collet when desired.

In many prior collets, a user is required to slide the collet rearwardly toward the tool housing in order to release the bit shaft from the collet. This rearward sliding can be a problem as the unintended application of a rearward directed force on the collet can inadvertently cause the shaft to be released from its held condition in the collet. This can cause damage to the work as well as create a safety hazard for the tool operator.

Accordingly, there is a need for a hand-held power tool that provides the capability of driving a working element for two distinct motions thereof, i.e. rotation and reciprocation, while still having a compact transmission system. Such a power tool should have a sturdy, heavy duty transmission for generating rotary and reciprocating action of the working element as the working element will often be applied with some pressure such as by a worker using the tool against a surface to be cleaned. The tool should be ergonomically designed so that it can be gripped at a variety of locations along its housing to accommodate the areas it must reach while also allowing an operator to exert the appropriate amount of control and pressure on the working element. There is a need for a tool that minimizes the risk of inadvertent release of the bit shaft as releasably held in the collet of the tool. Further, an easier to manufacture and assemble collet would be desirable.

For dual mode tools, a mechanism which prevents a user from shifting the tool from its rotating mode to its reciprocating mode while the tool is being operated to avoid shock loads on the gears and shafting of the transmission system and stripping of gear teeth would be desirable. Finally, the power tool should be capable of being used with a wide variety of working elements which can be easily and quickly interchanged with each other for use with the tool.

SUMMARY OF THE INVENTION

In accordance with the present invention, a collet assembly is provided that securely holds tool bit shafts therein while allowing them to be readily and easily interchanged. The collet assembly herein has a very few number of parts and is easily assembled without the need for any special tools or machines therefor. In a preferred form, the collet assembly provides for release of the tool shaft by a forward sliding action of a collet sleeve. In this manner, rearward forces acting on the sleeve in an axial direction such as can occur during tool operations will not cause the tool shaft to be accidentally released. Another advantage is the use of a retaining member for releasably holding the shaft. The retaining member avoids the use of detent balls as in prior collets which can require ramp surfaces formed to very precise tolerances to engage and shift the balls into and out of a holding position on the shaft.

In one form of the invention, a collet assembly for a power tool is provided including an inner body having an axial bore configured to receive a tool bit shaft therein. An outer collet sleeve is slidably mounted over the inner body. A resilient member has portions in the bore at a predetermined axial position therein for being releasably received in a recess of the tool shaft. Cooperating portions of the resilient member and the collet sleeve are provided which urge the resilient member portions in the shaft recess out therefrom to allow the shaft to be removed from the collet assembly as an incident of relative sliding movement between the collet sleeve and inner body.

In a preferred form, the cooperating portions include a control portion of the resilient member external of the inner body bore, and a cam member inside the collet sleeve. The control portion and cam member have predetermined configurations so that with relative sliding between the sleeve and body, the cam member resiliently deforms the control portion from its predetermined configuration causing the resilient member portions in the bore to shift out from the shaft recess.

Preferably, the resilient member includes a retaining spring having a pair of legs extending into the bore on either side thereof. The cooperating portions include an arcuate control portion of the spring on the top of the body and a wedge cam member on the collet sleeve adapted to engage the control portion for urging the legs out from the shaft recess as the collet sleeve and inner body undergo relative sliding movement.

The arcuate control portion of the retaining spring can have a narrow throat portion which opens in a rearward direction and toward the wedge cam member with forward sliding of the collet sleeve relative to the body causing the wedge cam member to urge the spring throat portion apart moving the spring legs out from the shaft recess so that axial forces acting on the sleeve in the rearward direction do not cause the shaft to release from the bore.

The wedge cam member can have opposite ramp surfaces which progressively force opposite sections of the spring control portion apart as the sleeve and body are slid relative to each other from a predetermined operating position and so that the sleeve and body are biased back toward the predetermined operating position by the opposite sections of the spring control portions acting on the ramp surfaces.

In one form, the resilient member is a wire form spring and the resilient member portions in the bore are wire leg portions with the wire form spring having a small cross-sectional diameter to minimize space requirements therefor in the assembly.

In a preferred form, a take-up member is mounted to one of the inner body and shaft for minimizing play between the bore of the body and shaft with the resilient member portions received in the shaft recess.

In another form of the invention, a combination is provided of a power tool for driving a working element that is mounted to an elongate shaft thereof. The combination includes a housing of the power tool having a forward end. A collet assembly is mounted at the forward of the housing. An inner body of the collet assembly has an axial bore configured to receive the shaft therein. An outer collet sleeve is slidably mounted over the inner body. A recess of the shaft has abutment walls extending normal to the length of the shaft. The retaining member is disposed at a predetermined position in the bore and received in a recess of the shaft with the retaining member confined by one of the abutment walls to prevent the shaft from being pulled out of the bore. An actuator for the retaining member is operated by sliding of the collet sleeve to cause the retaining member to shift out from the recess and clear the abutment wall for allowing the shaft to be removed from the bore.

In one form, the bore includes a countersunk portion and the shaft includes a resilient member mounted thereabout at a predetermined position from the recess of the shaft so that with the retaining member in the recess, the resilient member will be tightly received in the bore countersunk portion to minimize lateral and axial movement of the shaft in the bore during tool operations.

In another form, a biasing member in the bore is disposed at a rear end thereof so that with the shaft received and held in the bore by the retaining member, the shaft will be biased out from the bore to provide for one-handed release of the shaft by sliding of the collet sleeve with one hand to operate the actuator and releasing the collet sleeve so that the shaft is not held in the bore by the retaining member.

In another form, a resilient member is mounted to the inner body so that portions of the resilient member project into the bore for gripping the shaft inserted and held in the bore by the retaining member in the shaft recess to minimize axial and lateral movement of the shaft in the bore during tool operations. The portions of the resilient member can be disposed forwardly of the retaining member in the bore and are sized so that they do not fit in the recess of the shaft.

In another aspect of the invention, a method is provided for quickly allowing tool bits to be replaced in a power tool. The method includes providing an inner body and an outer sleeve of a collet assembly about the inner body, inserting a rear portion of a shaft of a first bit into an axial bore in the inner body, aligning a recess of the shaft with a retaining member in the bore to cause the retaining member to enter the recess, performing tool operations with a working element mounted at the forward end portion of the shaft with the shaft securely held in the bore by the retaining member, sliding the outer sleeve relative to the inner body causing the retaining member to shift out from the shaft recess, and removing the shaft from the bore for replacing it with a shaft of a second bit.

BRIEF DESCRIPTION OF THE DRAWINGS

FIG. 3 is an exploded perspective view of the power tool of FIG. 1 showing the rotary/reciprocation transmission system and the motor therefor, a motor on/off switch, a control actuator for the motor, a PCB including linear switches for the motor, and the collet assembly;

FIG. 4 is a side elevational view of the interior of the housing showing the rotary/reciprocating transmission system and motor therefor and collet assembly assembled therein;

FIG. 5 is an enlarged cross-sectional view taken along line 5—5 of FIG. 3 showing the transmission system in its reciprocating mode with a holding member received in a seat of the output member so that the transmission system is in its reciprocating mode of operation;

FIG. 15 is a side elevational view of the output member;

FIG. 16 is front end elevational view of the output member;

FIG. 17 is a rear end elevational view of the output member showing the interior thereof including the teeth formed thereabout;

FIG. 18 is a cross-sectional view of the output member taken along line 18—18 of FIG. 17;

FIG. 19 is a side elevational view of one of the two parts that are attached to form the input member;

FIG. 20 is a front end elevational view of the input member one part;

FIG. 21 is a side elevational view of the other part of the input member;

FIG. 22 is a front end elevational view of the input member other part;

FIG. 23 is a rear end elevational view of the input member second part;

FIG. 28 is a cross-sectional view of the collet assembly prior to insertion of the tool shaft into a bore of the collet inner body;

FIG. 29 is a view taken along line 29—29 showing the take-up spring including portions projecting into the bore of the collet inner body;

FIG. 30 is a cross-sectional view of the collet assembly showing the bit shaft inserted in the inner body bore with the retaining spring received in a recess on the shaft;

FIG. 31 is across-sectional view taken along line 31—31 of FIG. 30 showing the portions of the take-up spring gripping the bit shaft;

FIG. 41 is an exploded perspective view of the collet assembly of FIG. 40 showing an inner body having notches for the leg portions of the retaining member and a pedestal for mounting the control portion of the retaining member;

FIG. 42 is an elevational view partially in section showing the shaft releasably held in the bore of the inner body;

FIG. 43 is a view similar to FIG. 42 showing the collet outer sleeve slid forwardly to cause the cam member to engage the control portion for shifting the retaining member leg portions out from the recess of the bit shaft;

FIG. 45 is a perspective view of an inner body and a spring retaining member of the collet assembly of FIG. 44;

FIG. 46 is a side elevational view of the inner body and the spring retaining member of FIG. 45;

FIG. 47 is a plan view of the inner body and the spring retaining member;

FIG. 48 is a front elevational view of the inner body; and

FIG. 49 is a rear elevational view of the inner body and the spring retaining member.

DETAILED DESCRIPTION OF THE PREFERRED EMBODIMENTS

Figure 1:
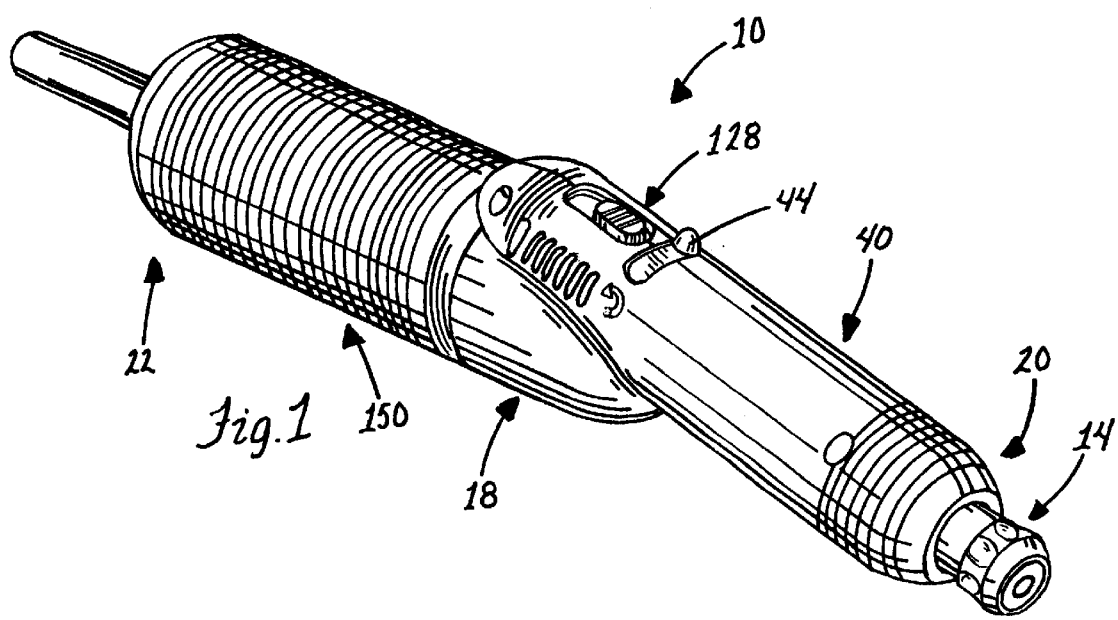
FIG. 1 is a perspective view of a power tool in accordance with the present invention showing a housing having a collet assembly mounted at its forward end.
Figure 26:
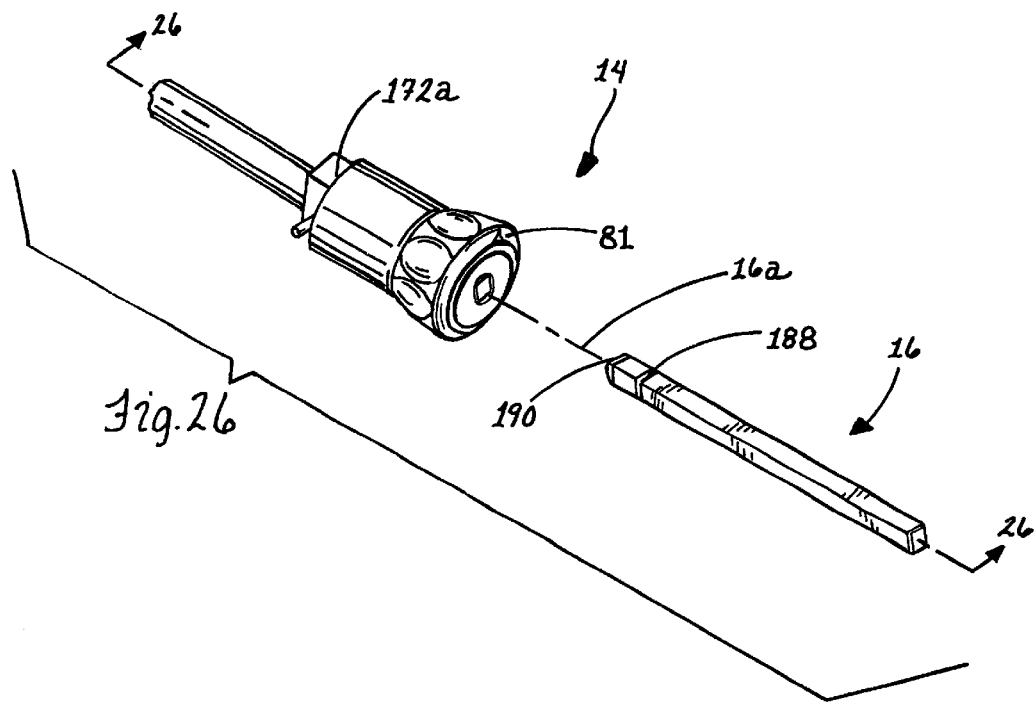
FIG. 26 is a perspective view of the collet assembly and a shaft of a tool bit for being releasably received in the collet assembly.

In FIG. 1, a power tool 10 in accordance with the present invention is illustrated. The power tool 10 herein has a transmission system 12 (FIG. 2) that provides a working element with two distinct types of motion, i.e. rotary or reciprocating. The working element is attached to the power tool 10 via a collet assembly 14 and a tool shaft 16, such as shown in FIG. 26. The tool 10 includes an elongate housing 18 having a forward end portion 20 and a rearward end portion 22 with the collet assembly 14 being mounted at the housing forward end portion 20.

As mentioned, the transmission system 12 is adapted to provide rotary or reciprocating motion to the tool bit held by the collet assembly 14. In this regard, the transmission system 12 converts the rotary output provided by motor 24 into either rotary or reciprocating motion of output shaft 25 which is operatively connected to the collet assembly 14, as will be described in more detail hereinafter. The transmission system 12 herein is advantageous in that while able to convert the motor output into either rotary or reciprocating motion of the output shaft 26, the transmission system 12 still has a very compact design minimizing the amount of space it requires in the housing 18. This allows the housing 18 to have a smaller design advantageous for the hand-held power tool 10 described herein.

More particularly, the rotary/reciprocating transmission system 12 has rotary cooperating portions in the form of an input member 26 that is driven by the motor 24 for rotation, and an output member 28 which is connected to the output shaft 25 for providing it with either rotary or reciprocating motion depending on the selected mode by the user. To provide the transmission 12 with dual modes of operation, a clutch 30 and a cam mechanism 22 are provided so that the input and output members 26 and 28 have engaged and disengaged states with the clutch 30 engaged and disengaged, respectively; and the cam mechanism 32 causes the output member 38 to reciprocate when the clutch is disengaged, as will be described herein. In the preferred form, the transmission 12 can be a so called "barrel cam transmission" with the output member 28 including a substantially cylindrical portion 34 having an interior space 36 therein. The input member 26 can have a two part construction and be mounted in the interior space 36. As discussed, the transmission 12 herein has a very compact design, and to this end, the clutch 30 and cam mechanism 32 can be provided between the input member 26 and output member 28 in the interior space 36.

The output shaft 25 is aligned along a first housing axis 38 and the input and output members 26 and 28 are also aligned along the axis 38 and mounted for rotation thereabout with the output member 28 connected to the output shaft 25 and the input member 26 connected to an intermediate shaft 39. The alignment of the components of the transmission system 12 herein eliminates the lateral space requirements of prior transmissions which used components such as counter shafts and the like offset from the main output shaft in order to obtain dual modes of operation. As the present transmission system 12 has the input and output members 26 and 28 and the output shaft 25 and intermediate shaft 38 all aligned along the housing axis 38, the housing 18 and in particular, portion 40 thereof including the forward end 20 and containing the aforedescribed transmission components therein can be provided with a smaller size especially in the lateral dimension transverse to the axis 38. Accordingly, the compact transmission 12 herein provides for a smaller more compact hand-held tool 10.

To allow the user to select between either the rotary mode or reciprocating mode of operation for the tool 10 herein, a control actuator 42 is provided. In the preferred form, the control actuator 42 is a rotary actuator and is mounted to the housing portion 40 which, as shown, has a curved or arcuate shape thereto about the central axis 38 thereof. To this end, the rotary actuator 32 can be rotated about the axis 38 and includes a control lever portion 44 exterior of the housing 18 which can be shifted by an operator between first and second positions corresponding to the rotary and reciprocating modes of operation and an actuator portion 46 in the housing for purposes as described herein.

Figure 7A:
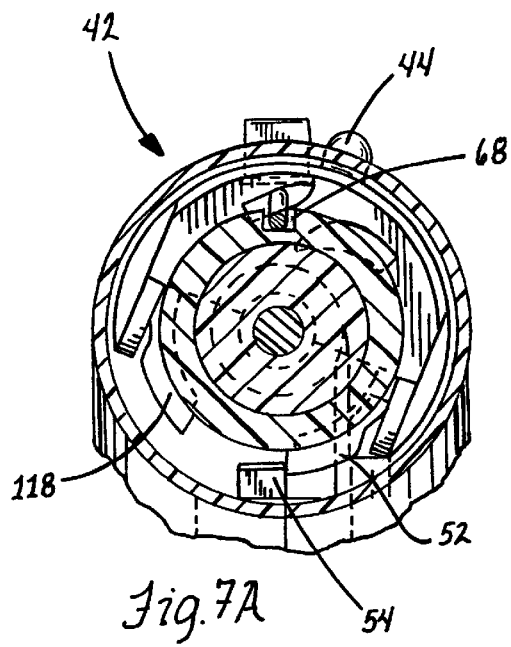
FIG. 7A is a view taken along line 7A—7A of FIG. 5 showing a leg of the actuator shifting a projection of a linear switch for changing the direction of the motor output.
Figure 8A:
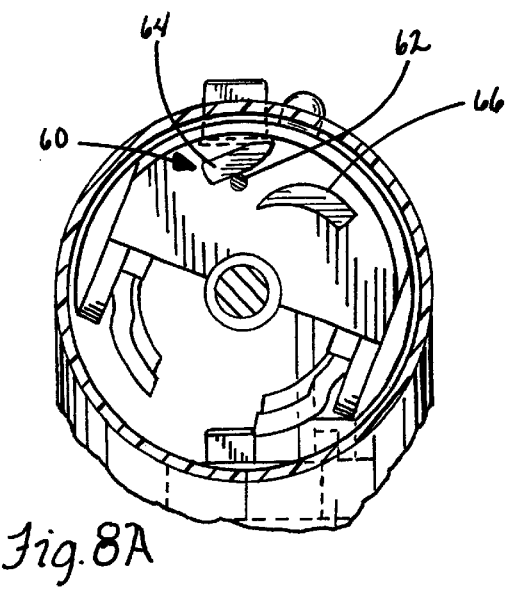
FIG. 8A is a view taken along 8A—8A of FIG. 5 showing a cam member of the actuator urging the holding member into the seat.
Figure 9:
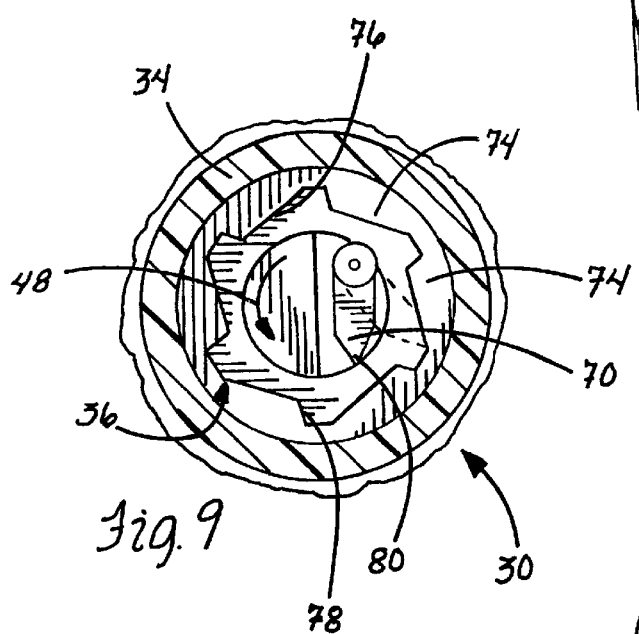
FIG. 9 is a cross-sectional view showing the clutch in its disengaged condition with a pawl of the clutch camming over teeth as the transmission input member is rotated in one direction.
Figure 10:
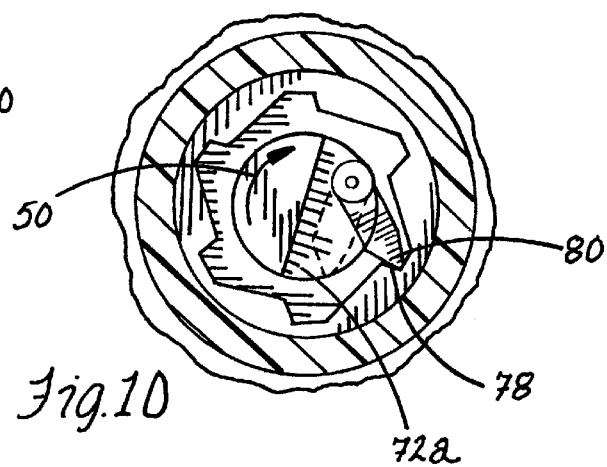
FIG. 10 is a cross-sectional view similar to FIG. 9 showing the input member rotated in the opposite rotary direction with the pawl locked into one of the teeth of the outer member.

The motor 24 of the transmission system 12 is reversible so that its rotary output is in either forward or reverse directions of rotation as indicated by arrows 48 and 50 in FIGS. 9 and 10. Referring to FIGS. 5, 7A and 8A, with the rotary actuator 46 rotated so that the control portion 44 is in the right endmost position as shown, the actuator portion 46 and in particular leg portion 52 thereof will engage and shift a projection 54 of a linear switch 56 mounted to PCB 58 in the housing portion 40. The linear switch 56 controls the polarity of the motor 24 and thus the rotary output therefrom. In this regard, the output will be in the direction of arrow 48 of FIG. 9 for causing reciprocating motion of the output shaft 25, as described hereafter.

Figure 8B:
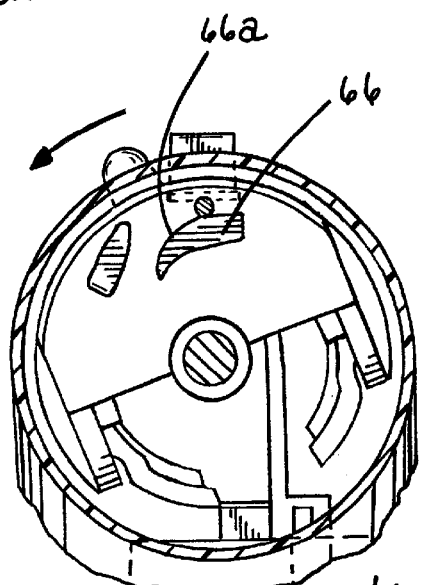
FIG. 8B is a view taken along 8B—8B of FIG. 6 showing another cam member of the actuator lifting the holding member out from the seat.

With the rotary actuator 42 shifted to the reciprocating position, a stop mechanism 60 will be operable so that the input and output members 26 and 28 are rotatable relative to each other. More specifically, the stop mechanism 60 includes a holding member 62 in the form of an elongate spring fixed at its forward end in the housing and having its rearward end disposed between a pair of cam members 64 and 66 formed on the actuator portion 46 of the rotary actuator 42, as best seen in FIGS. 8a and 8b. In the reciprocation mode, the actuator portion 46 will be shifted so that the cam member 64, and in particular curved cam surface 64a thereof, engages the spring 62 and urges an intermediate portion 62a thereof into an axial seat or channel 68 formed on the exterior of the output member cylindrical portion 34. In this manner, the output member 28 is restricted from rotation once the channel 68 thereof is aligned with the fixed position of the spring 62 relative to the rotary path of the output member 28. It is also contemplated that the holding member 62 can be biased to its operative position thus eliminating the need for cam member 64.

As previously described, the clutch 30 is provided between the input member 26 and the output member 28, as best seen in FIGS. 9 and 10. The preferred clutch 30 is a one-way clutch in the form of a pawl and ratchet clutch where the pawl 70 is pivotally attached to the forward end face 72 of the input member 26, and in particular to a recessed portion 72a thereof. The ratchet teeth 74 are formed about the interior of the output member cylindrical portion 34 and include ramp surfaces 76 and abutment surfaces 78. With the motor output in the direction of arrow 48, the pawl 70 will pivot outwardly due to centripetal force so that its distal end 80 extends beyond the end face 72 and into engagement with the teeth 74 and the pawl end 80 will cam over the ramp surfaces 76 so that it will not lock into the teeth. Because the holding spring 62 is received in the output member seat 68, the rotation of the input member 26 will not cause rotation of the output member 28 as the clutch 30 is in its disengaged condition and the output member 28 is fixed by the spring 62 so that relative rotation occurs between the input and output members 26 and 28.

As there is only a single seat channel 68 in the output member 28, it is likely that when the motor 24 is energized, the seat 68 will not be aligned with the fixed position of holding spring 62. There are sufficient frictional forces in the transmission system 12 such as due to impingement of the pawl 70 on the teeth 74, that there may be some rotation of the output member 28 and thus output shaft 25 before the seat 68 moves into alignment with the holding spring 62 to stop further rotation of the output member 28. This situation is beneficial in that in this manner, the output member 28 will always be in a predetermined rotary orientation thereof when it is reciprocating. Accordingly, the output shaft 25 and attached collet assembly 14 will always be in predetermined known orientation when the tool 10 is in its reciprocating mode. This allows a user to predictably insert a tool bit in the collet 14 in a desired orientation for providing reciprocating movements of whatever working element they may want to use in this mode. To this end, an indica 81 can be provided at the forward end of the collet 14 such as in the form of an arrow so that when the arrow 81 is pointing in a certain predetermined direction, e.g. directly down, the user will know that the collet 14 will reciprocate in this orientation thereof.

Figure 13:
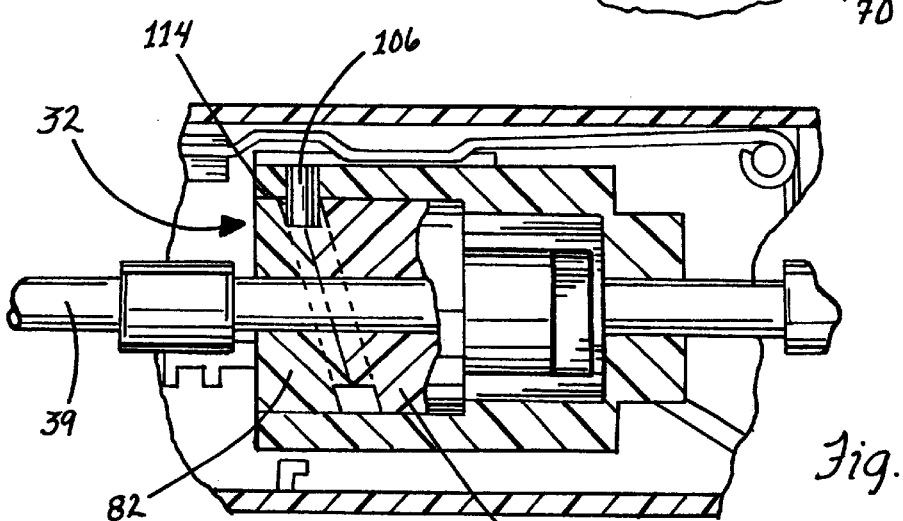
FIG. 13 is a side sectional view taken through the input and output members of the transmission showing the holding member in the output member seat and a cam follower of the output member in a cam track of the input member with the transmission in its reciprocating mode of operation.
Figure 14:
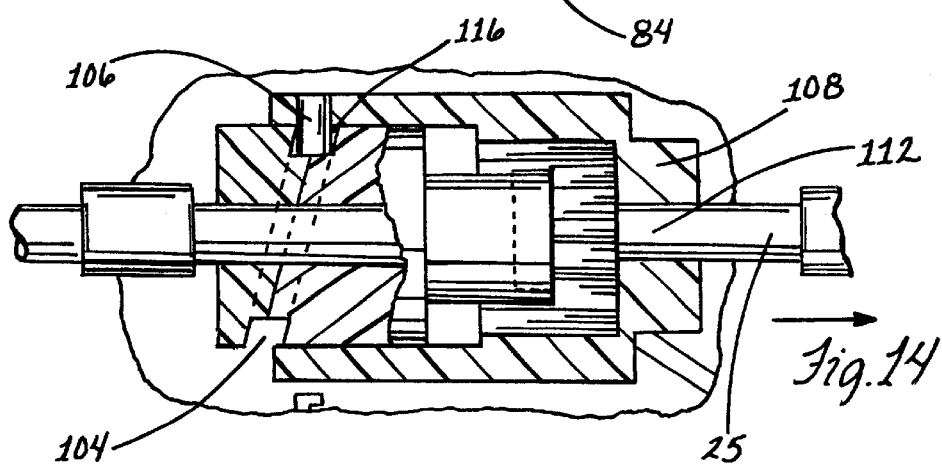
FIG. 14 is a view similar to view 13 showing the input member rotated relative to the output member to cause the output member to reciprocate.

With the input and output members 26 and 28 in the disengaged state as described above, the cam mechanism 32 is operable to provide the output member 28 with reciprocating movement in a back and forth axial direction along axis 38 with the spring 62 sliding in seat 68 as the output member reciprocates. Referring to FIGS. 13 and 14, the input member 26 has first and second parts 82 and 84 which are mounted to a reduced end portion 86 of the intermediate shaft 39 by way of openings 88 and 90 of the first and second parts 82 and 84 aligned with respective openings 92 and 94 provided in the shaft portion 86 via mounting pins 96 and 98. Each of the first and second parts 82 and 84 include complementary reduced diameter annular portions 100 and 102 that are angled relative to a normal position with respect to the axis 38. With the input member parts 82 and 84 mounted to the shaft 39, the annular portions 100 and 102 cooperate to form a cam track 104 thereabout into which a cam follower pin 106 projects. The pin 106 is mounted to the output member cylindrical portion 34 so as to project into the interior space 36 and the input member track 104.

Accordingly, with the actuator 42 shifted to the reciprocating mode position and the output member 28 held from rotation by the holding spring 62 as received in the seat 68, the action of the pin 106 in the cam track 104 will drive the output member 28 for reciprocating movement along the axis 38. As shown, the output member 28 includes a reduced diameter forward portion 108 having a D-shaped opening 110 for receiving a correspondingly shaped reduced portion 118 at the rear end of the output shaft 25. Thus, reciprocation of the output member 28 along axis 38 similarly causes reciprocation of the output shaft 25 and the collet assembly 14 and tool bit held therein.

As can be seen in FIGS. 13 and 14, the configuration of the cam track 104 defines the amount of reciprocation or stroke that the tool bit will have. In FIG. 13, the pin 106 is at point 114 in the cam track 104 which is the rearward most axial position of the track 104 on the input member 26. Rotation of the input member 26 by 180 degrees brings the forwardmost point 116 of the track 104 into alignment with the pin 106 which causes the output member 28 to translate to its forwardmost position along axis 38. Continued rotation of the input member another 180 degrees causes the output member 28 to translate back rearwardly to the position of FIG. 13 so that one full rotation of the input member 26 produces one full complete stroke of the tool bit.

Figure 6:
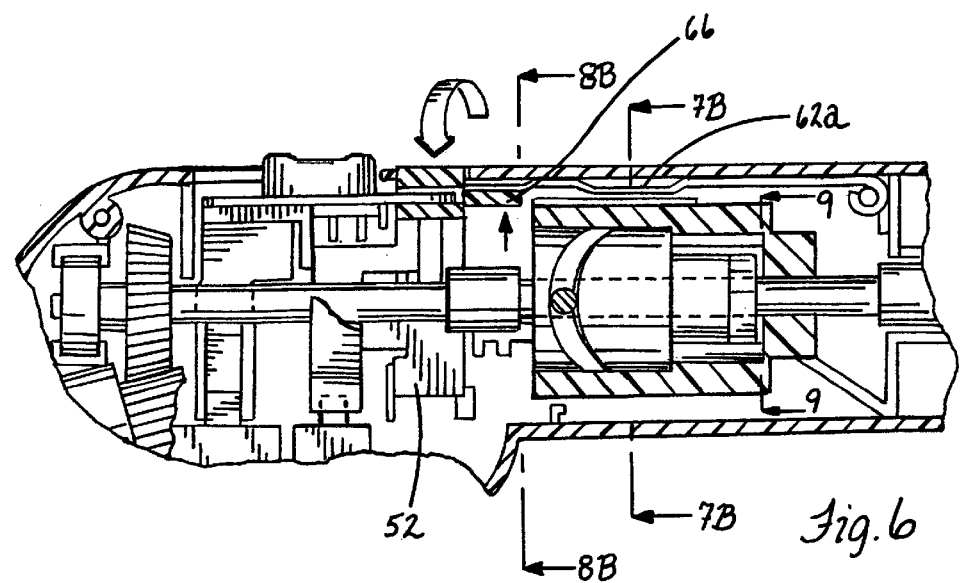
FIG. 6 is a view similar to FIG. 5 showing the control shifted to change the direction of the motor rotary output and to lift the holding member out of the seat so that the transmission system is in its rotary mode of operation.
Figure 7B:
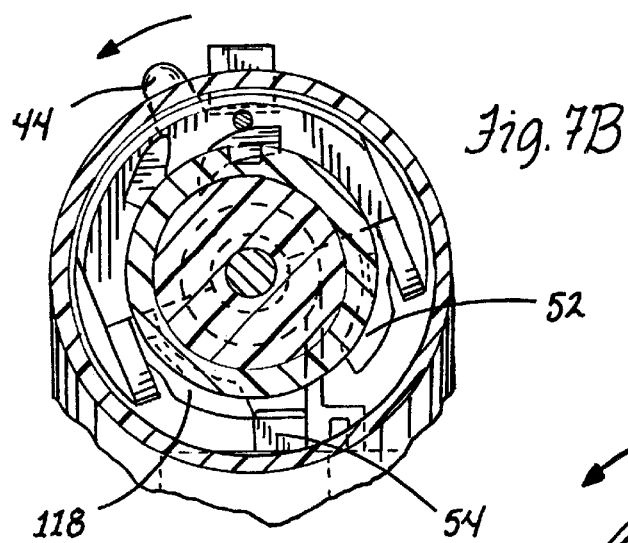
FIG. 7B is a view taken along line 7B—7B of FIG. 6 showing the actuator shifted so that its other leg engages the switch projection to change the direction of the motor rotary output.

To shift the tool 10 into its rotary mode of operation, the lever 44 of the rotary actuator 42 is shifted to the left, as shown in FIGS. 7B and 8B. In this position, the actuator portion 46 will be rotated about axis 38 sufficiently so that the end of leg 118 opposite leg 52 engages the switch projection 54 and shifts it linearly so as to change the polarity and thus the rotary output of the motor 24 to the rotary direction indicated by arrow 50 in FIG. 10. Referring to FIG. 6, the actuator portion 46 is disposed rearwardly of the input and output members 26 and 28 in the housing portion 40 and the rearward end of the spring holding member 62 extends rearwardly beyond the end of the members 26 and 28 and between the cam members 64 and 66, as previously described. Accordingly, when the actuator portion 46 is rotated as shown in FIGS. 7B and 8B, the cam members 66 will engage the rear end of the spring 62 with curved cam surface 66a thereof such that at the rotary mode position of the control lever 44, the spring 62 will be lifted so that the portion 62a thereof in the outer member seat 68 is lifted out therefrom. Accordingly, the output member 28 is no longer restrained from rotation by the spring holding member 62.

Referring to FIG. 10, with the input member 26 rotating in the direction of arrow 50, the pawl 70 will pivot out into the ratchet teeth 74 and its distal end 80 will lock into the teeth 74 by abutting against the surface 78 of one of the teeth 74. In this manner, rotation of the input member 26 causes the output member 28 to rotate therewith in a secure fashion. Once the pawl 70 is locked into the ratchet teeth 74 which will occur almost immediately upon rotation of the input member 26, the output member 28 will rotate with the input member 26 in their engaged state with the clutch 30 in the engaged condition and transmit rotary motion to the output shaft 25 and the collet assembly 14 and tool bit held therein. The present pawl and ratchet tooth clutch 30 will remain engaged in the rotary mode regardless of forces applied to the output shaft 25. Further, in the reciprocating mode, the clutch 30 provides for a smooth free wheeling action of the output member 28 about the input member 26 so as to provide a smooth, continuous reciprocating action for the tool bit during tool operations.

Figure 11:
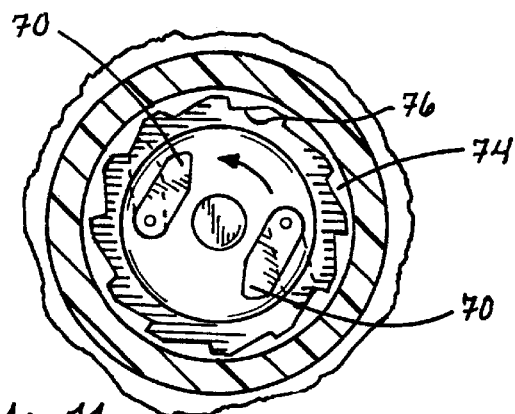
FIG. 11 is a sectional view similar to FIG. 9 showing an alternative form of the clutch where two pawls are provided and are camming over the teeth as the input member is rotated.
Figure 12:
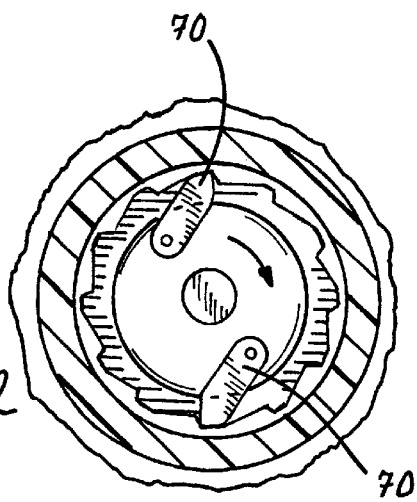
FIG. 12 is a view similar to FIG. 11 showing the pawls pivoted out to lock into respective teeth of the outer member.

FIGS. 11 and 12 depict an alternate form for the clutch 30 where a plurality of pawls 70 are eccentrically mounted to the input member 26. As shown, two pawls 70 are mounted at diametrically opposite positions on the input member end face 72 and the number of ratchet teeth 74 formed in the output member 28 is increased over that shown in FIGS. 9 and 10 for the single pawl clutch 30. FIG. 11 depicts the reciprocating mode of operation where the clutch is in its disengaged condition and the pawls 70 ride over the ramp surfaces 76 of the teeth so that the input and output members 26 and 28 are in their disengaged state and rotate relative to each other, as previously described. FIG. 12 shows the input member 26 rotating in the opposite direction in the rotary mode of operation of the tool 10 with both pawls 70 pivoted out into a locked condition in the teeth 74 to provide further engagement area between the pawls 70 and teeth 74 over the single pawl clutch 30.

Figure 24:
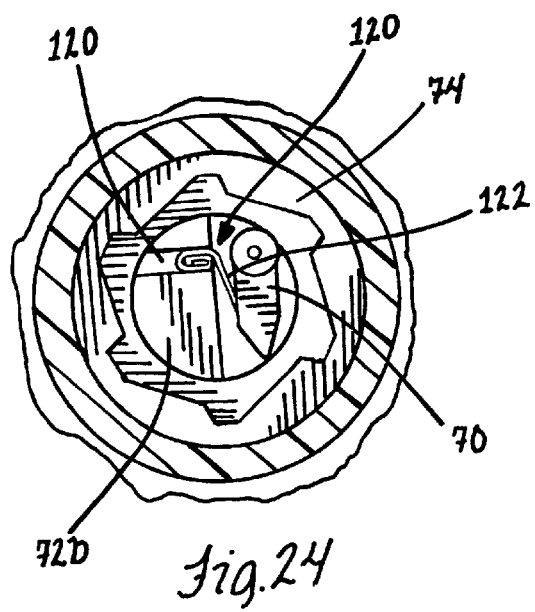
FIG. 24 is an end elevational view partially in section taken through the input and output members showing another form of the clutch with the pawl being biased by a torsion spring towards the teeth.
Figure 25:
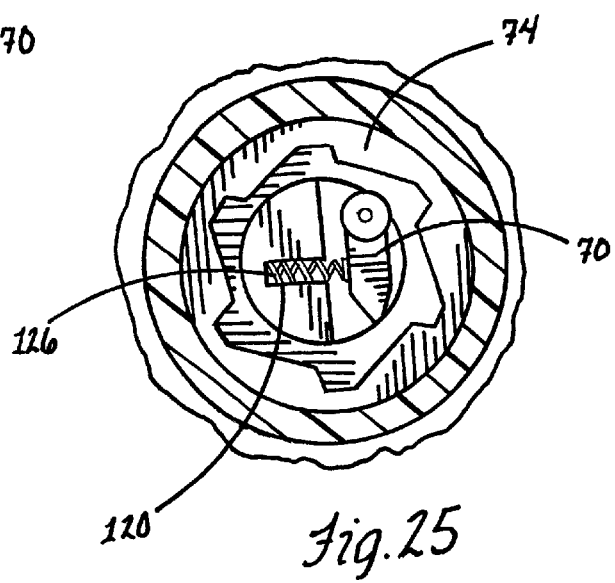
FIG. 25 is a view similar to FIG. 24 showing yet another form of the clutch where the pawl is biased by a compression spring toward the teeth.

Referring to FIGS. 24 and 25, alternative designs for the single pawl clutch 30 are shown. Each of these alternative forms utilize a spring bias force to urge the pawl 70 toward the ratchet tooth 74 so that the pivoting of the pawl 70 does not rely exclusively on centripetal force generated by rotation of the input member 26. As earlier described, the single pawl 70 is pivotally pinned to a recessed portion 72a of the input member end face 72. Accordingly, the end face 72 includes a raised portion 72b adjacent the recessed portion 72a and in which a mounting opening 120 can be provided. In the form of FIG. 24, the spring bias is obtained by the lever arm 122 of a torsion spring 124, while in FIG. 25, the outward bias force on the pawl 70 is obtained by a compression spring 126, with the springs 124 and 126 being mounted in their respective openings 120. In both cases, the springs 124 and 126 serve to insure that the pawl 70 achieves and maintains secure engagement in the teeth 74 when the clutch 30 is engaged.

To energize and de-energize the motor 28, a motor on/off switch 128 is provided on the housing portion 40, as shown in FIGS. 1, 4 and 5. The motor switch 128 has a fork actuator portion 130 extending into the housing portion 40 for operating linear switch 132 mounted on PCB 58. Accordingly, sliding the switch 128 will cause the fork actuator 130 to slide switch projection 134 of the linear switch 132 to either a motor "off" position where the motor 24 is de-energized or a motor "on" position where the motor 24 is energized.

In order to minimize shock loads on the motor gearing such as the output pinion gear 136 of the motor and the bevel face gear 138 meshed therewith, it is desirable to prevent shifting of the rotary actuator 42 when the motor 24 is running. Accordingly, an interlock is provided between the motor switch 128 and the rotary actuator 42 so that with the motor switch 128 shifted to the "on" position, a user can not shift the rotary actuator from the reciprocating mode position to the rotary mode position thereof.

As previously described, the rotary actuator 42 pivots or rotates about the axis 38, whereas the motor switch 128 slides linearly between the "off" and "on" positions transverse to the acuate path of the rotary actuator 42. The switch 128 has a mounting plate 140 from which the fork actuator 130 depends. Projecting up from the plate 140 is the switch knob 142 for being engaged by a user to slide the plate 140 and fork actuator 130 forward and back in a linear path transverse to the acuate path of the control 42. The upper surface of the plate 140 forwardly of the knob 142 includes a elongate recess or channel 144. The rotary actuator 42 has opposite projections 146 and 148 formed on the inner surface of its legs 52 and 118. When the rotary actuator 42 is rotated to its right endmost position for putting the tool in the reciprocating mode of operation, the projection 146 will be shifted into alignment with the switch channel 144 so as to allow the motor switch 128 to be shifted from its rearward "off" position to the forward "on" position with the projection 146 sliding in the channel 144. Any attempt to rotate the lever portion 44 to the left for putting the tool into the rotary mode of operation while the motor switch 128 is in its forward "on" position will cause the projection 146 to abut against the walls of the channel 144 preventing rotation of the actuator until the switch 128 is slid rearwardly to its "off" position. In the "off" position of the switch 128, the projection 146 is shifted out from the channel 144 to allow rotation of the actuator 42.

Similarly, the switch 128 can not be shifted from its "off" position to its "on" position unless the rotary actuator 42 is in the reciprocating mode position at the right endmost point in its arcuate path or in the rotary mode position in the left endmost position of its path as otherwise one or the other of the projections 146 and 148 will interfere with the forward sliding of the switch plate 140 acting as stops as they will not be aligned with the channel 144 in the plate 140. This is important to insure proper operation of the tool 10 so that the motor 24 can not be energized before the holding member 62 and the switch projection have been properly actuated by actuator portion 46 of the control actuator 42, as has been previously described.

Turning next to some of the details of the construction of the power tool 10 herein, the housing 18 in its preferred form has a rear housing portion 150 including the rear end 22 and aligned about longitudinal axis 152 thereof with the axis 152 being slightly angled relative to axis 38 of housing portion 40 at an obtuse angle thereto. In this manner, the housing 18 has a gun-type design where the rear housing portion 150 can be used as a handle for gripping by an operator to manipulate the tool into hard-to-reach areas for providing access thereto with the working element. In addition, the rear housing portion 150 can contain the motor 24 therein with the transmission system 12 contained in the housing portion 40, as previously described.

Figure 2:
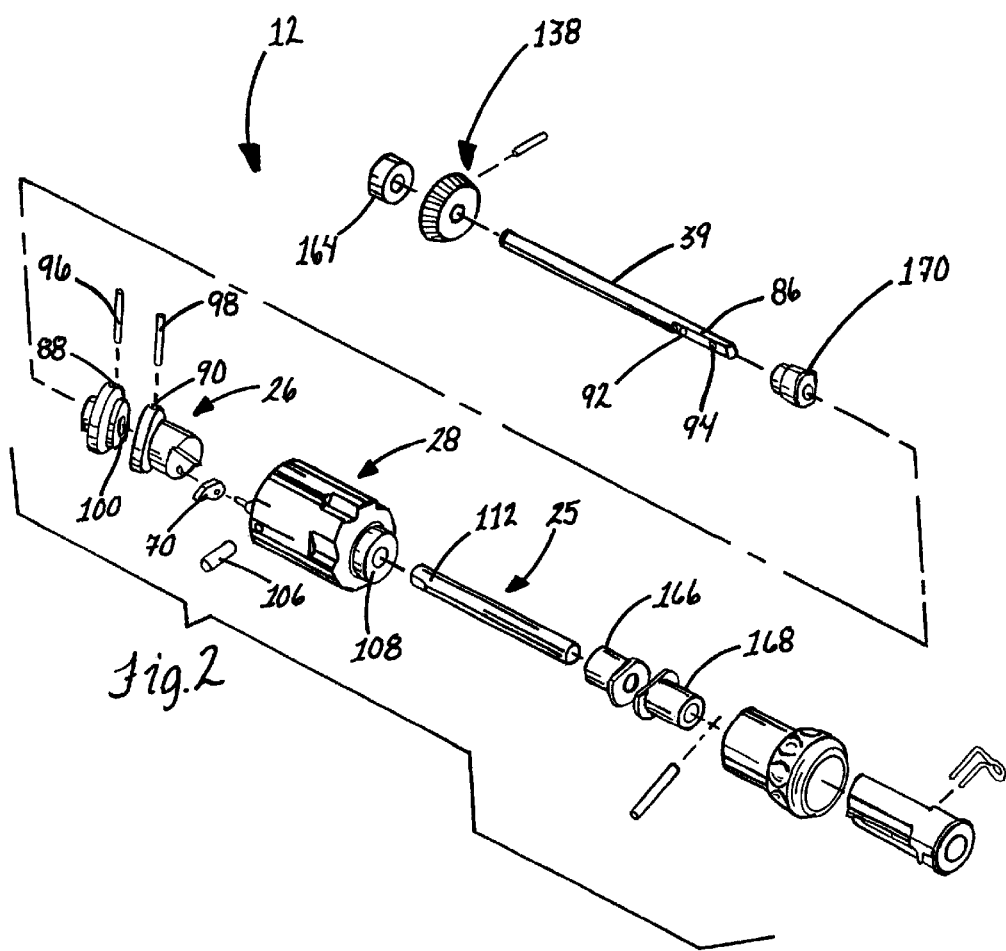
FIG. 2 is an exploded perspective view of a rotary/reciprocating transmission system and collet assembly of the power tool of FIG. 1 showing input and output members of the transmission and an inner body and outer sleeve of the collet assembly.

Referring next to FIGS. 2 and 3, the motor 24 can be provided with a fan 154 disposed at the rear thereof with the housing having cooling slots 156 formed at the rear end portion 22 thereof to minimize potential overheating during tool operations. The housing 18 preferably has a clam-shell construction with housing half 158 and housing half 160 that can be molded plastic parts and secured together along part line via fasteners (not shown). An electrical cord 162 extends out from the rear end 22 of the housing 18 when the portions 158 and 160 are attached for providing power to the motor 24.

The housing halves 158 and 160 are provided with a plurality of integral bracket members 162 therein that are designed to clamp against bearings and support the motor 24 and PCB 58 in the housing 18 when the housing halves 158 and 168 are attached. A ring bearing 164 is provided at the end of intermediate shaft 39 rearwardly of gear 138 to support the intermediate shaft 39 for rotation as driven by the motor gear 136. To support the output shaft 25, a pair of guide bushings 166 and 168 are provided between the forward end portion 108 of the transmission output member 28 and the rear of the collet assembly 14. A similar bushing 170 can also be provided at the forward end of the intermediate shaft 39.

Figure 27:
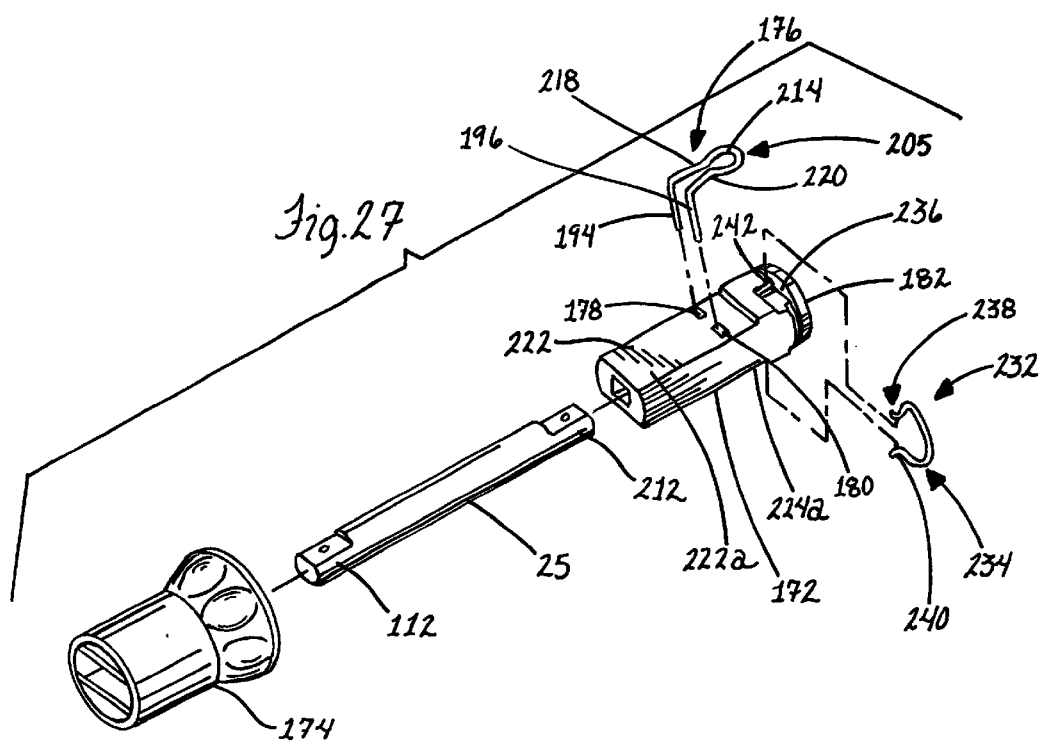
FIG. 27 is an exploded perspective view of a collet assembly showing a collet outer sleeve, output shaft, and an inner body of the collet assembly including a spring retaining member and an optional take-up spring.

In FIG. 26, the collet assembly 14 is shown with the tool bit shaft 16 removed therefrom. The collet assembly 14 has a very few number of parts and is easily and quickly assembled. Referring to FIG. 27, the collet assembly 14 includes an inner body or core member 172, an outer collet sleeve 174, and a retaining member in the form of wire form spring 176. The body 172, sleeve 174 and retaining spring 176 can be manually assembled without requiring any special alignment mechanisms, tools or machinery for this purpose. The assembly procedures simply involve mounting the retaining spring 176 to the body 172 via openings 178 and 180 therein, and inserting the body 172 and spring 176 mounted thereto into the sleeve 174 until front circular face flange 182 of the body 172 abuts shoulder stops 184 and 186 provided at diametrically opposite positions in the collar bore 188, as can best be seen in FIGS. 37–39. The inner body 172 projects beyond the rear of the collet sleeve 174 for being attached to the output shaft 25, as described hereinafter.

An important advantage afforded by the present collet assembly 14 is the use of the retaining spring 176 rather than the detent balls or the like as found in many prior collets. To this end, the tool bit shaft 16 is provided with a recess 188 thereabout at a predetermined position from a tapered end 190 thereof.

Figure 32:
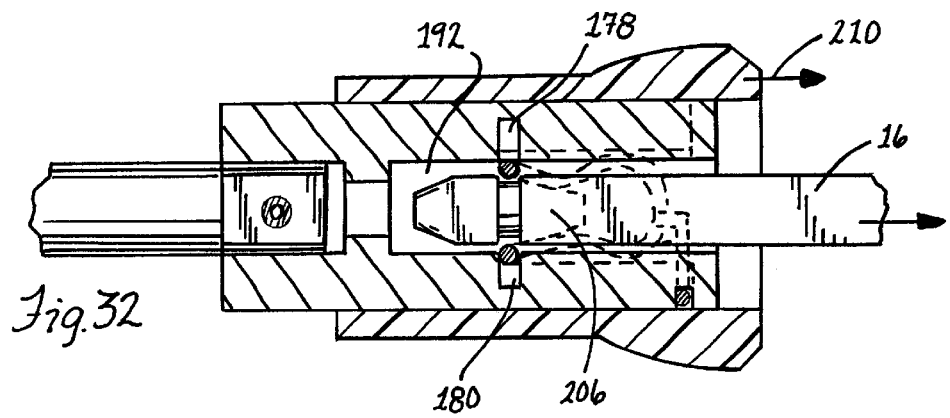
FIG. 32 is a cross-sectional view similar to FIG. 30 showing the outer sleeve slid forwardly relative to the outer body to shift a cam wedge member into engagement with a control portion of the retaining spring for shifting leg portions of the retaining spring out from the bit shaft recess.

The collet inner body 172 has a bore 192 having a substantially matching cross-sectional configuration to that of the tool bit shaft 16 which, as shown, have a polygonal or square shape in the preferred form. The openings 178 and 180 extend vertically to the collet body into communication with the bore 192. The spring retaining member 176 includes a pair of leg portions 194 and 196 spaced at a predetermined lateral distance from each other so that when they are inserted into the openings 178 and 180 they project into the bore 192 at a predetermined axial position therein, as best seen in FIGS. 30–32. In this manner, when the shaft 16 is inserted into the bore 192, it will be releasably held therein vis-a-vis spring legs 194 and 196 received in the shaft recess 188 at the predetermined position in the bore 192. More particularly, the lateral spacing between the legs 194 and 196 is greater than the size of the smallest portion of the shaft tapered end 190. The taper at the shaft end 190 is sized relative to the lateral spacing between the legs 194 and 196 so that the shaft 16 can be easily inserted with one hand. As the shaft 16 is inserted, the tapered end 190 thereof will fit between the spring legs 194 and 196 until continued insertion brings ramp surface 198 on the tapered shaft end 190 into engagement with the legs 194 and 196 to begin camming them apart, as discussed below.

It has been found that it is important for the width of the slot openings 178 and 180 to be approximately the same or slightly greater in size than the gauge diameter of the wire form spring retaining member 176, and in particular, to the leg portions 194 and 196 thereof. This is because as the shaft 16 is inserted, ramp surface 198 about the tapered end of the shaft 16 cams against the spring legs 194 and 196 urging them outwardly against the rear walls 178a and 180a of the slots 178 and 180 so that they can be forced outwardly and guided against these walls. If the slots 178 and 180 were not approximately the same size as the diameter of the spring legs 194 and 196, the camming action provided by ramp surface 198 instead of pushing the springs legs 194 and 196 against the slot back walls 178a and 180a, may cause one or both of the legs 194 and 196 to get jammed between the shaft 16 and bore walls 192a potentially damaging the legs 194 and 196. Accordingly, to get the legs 194 and 196 to properly open or spread apart during insertion of the shaft 16, the size of the width of the slots 178 and 180 should be approximately the same as that of the gauge diameter of the spring legs 194 and 196. Once the shaft 16 has been inserted so that the recess 188 thereof is in axial alignment with the spring legs 194 and 196 pushed out into the slots 178 and 180, the spring legs 194 and 196 will snap back into the bore 192 and into the shaft recess 188 to provide a clearly audible "click" to signal to the user that the shaft 16 has been correctly installed, i.e. pushed into the body 172 the correct distance. There is also a tactile feedback that accompanies the click to augment the audible feedback.

As previously discussed, the collet assembly 14 herein utilizes spring retaining legs 194 and 196 to releasably hold the tool bit shaft 16 and does not rely upon detent balls and actuating ramps that engage the balls in either the collect or the tool shaft as in many prior collet designs. In this regard, the tolerances for forming the shaft recess 188 are not as tight to ensure the shaft 16 is securely held in the collet assembly 14 while being able to be readily released therefrom. To this end, the recess 188 includes abutment walls 200 and 202 extending thereabout. As shown, the abutment walls 200 and 202 extend normal to the shaft axis 16a so that they do not provide a camming function when inserted or removed from the collet assembly 14. Thus, when the spring legs 194 and 196 are received in the recess 188 they will be confined by the abutment walls 200 and 202 on either side thereof to prevent axial movement of the shaft 16 relative to the collet inner body 172.

On the other hand, it has been found that the height of the walls 200 and 202 from the bottom annular surface 204 should preferably have portions that are at least as the high as the gauge diameter of the spring leg portions 194 and 196. In this manner, play between the shaft 16 and inner body 172 is minimized by the spring legs 194 and 196 engaged against the full height of the walls 200 and 202 in the shaft recess 188.

Figure 37:
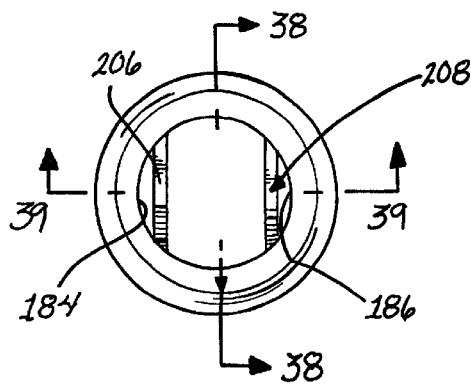
FIG. 37 is a front end view of the sleeve showing wedge cam members therein.
Figure 38:
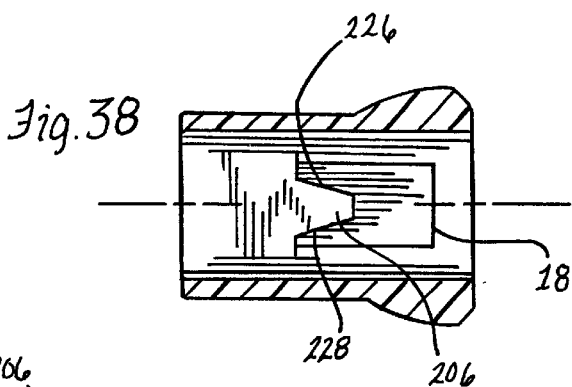
FIG. 38 is a cross-sectional view taken along line 38—38 of FIG. 37.
Figure 39:
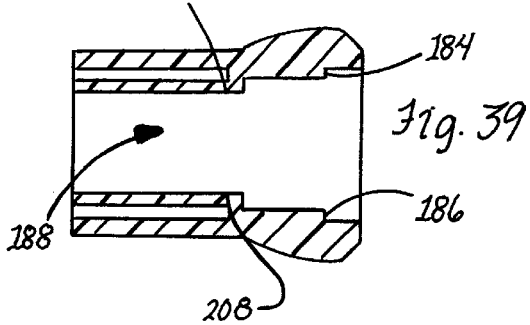
FIG. 39 is a cross-sectional view taken along line 39—39 of FIG. 37.
Figure 40:
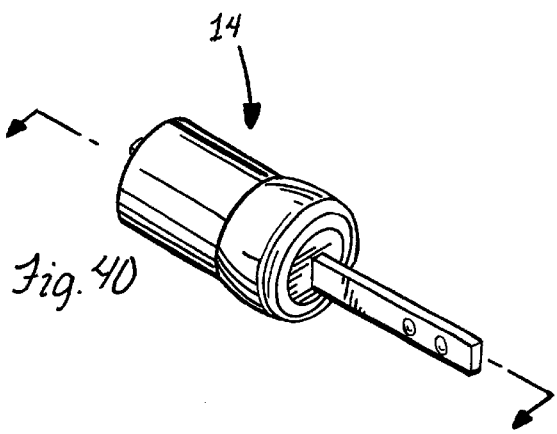
FIG. 40 is a perspective view of another form of a collet assembly and tool bit shaft in accordance with the invention.

For releasing the shaft 16 from the collet assembly 14, cooperating portions are provided on the retaining spring 176 and the collet sleeve 174 in the form of a control portion 205 of the retaining spring 176 and actuator cams 206 and 208 provided at diametrically opposite positions in the sleeve, as best seen in FIGS. 37–39. The sleeve 174 is mounted about the inner body 172 so as to be able to be slid forwardly relative thereto which causes one of the actuator cams 206 or 208 to engage the control portion 205 which, in turn, causes the spring leg portions 194 and 196 to be shifted out from the shaft recess 188. With the sleeve 174 held forwardly, a user can pull the shaft 16 out from the bore 192 without interference from the spring legs 194 and 196.

More particularly, the collar inner body 172 is connected at its rear projecting end 172a to a forward reduced portion 212 of the output shaft 25 so that when the tool 10 is not turned on, the inner body 172 is substantially fixed against movement in the axial direction. The control portion 205 of the spring retaining member 206 has a predetermined configuration including an arcuate or loop section 214 that opens rearwardly. The arcuate or loop section 214 narrows to a throat portion 216 thereof and from there the spring widens via sections 218 and 220 that taper away from each other until they meet the upper ends of respective leg portions 194 and 196 which depend downwardly therefrom.

As shown, the inner body 172 has a generally rectangular cross-sectional shape with bowed out ends and is disposed so that the flat sides 222 and 224 are at the top and bottom thereof. Rearwardly of the front face flange 182, the surfaces 222 and 224 are lowered at portions 222a and 224a, respectively, so that with the retaining spring legs 194 and 196 inserted into the slot openings 178 and 180 either from the top or the bottom surfaces 222 and 224 of the inner body 172, the throat portion 216 will be raised over the lowered surface portions 222a or 224a with the arcuate section 214 resting on the raised portion of the flats 222 and 224.

The cam actuators preferably have a wedge shape with ramp surfaces 226 and 228 tapering and diverging away from each other in the rearward direction. With the inner body 172 in the outer sleeve 174, the arcuate section 214 of the retaining spring 176 opens rearwardly facing one of the wedge cam actuators 206 or 208. In this manner, forward sliding of the sleeve 174 causes the one cam actuator 206 or 208 to push forward between the tapered sections 218 and 220 and cammingly engage in the throat portion 216 of the retaining spring control portion 205. Accordingly, forward sliding of the sleeve 174 causes the ramp surfaces 226 to spread the throat portion 216 open causing the legs 194 and 196 to spread laterally away from each other and out from the shaft recess 188, as shown in FIG. 32. The lowering of surfaces 222a and 224a as is apparent is desirable so that the wedge cam actuators 206 and 208 have clearance to engage into the throat portion 216 of the retaining spring control portion 205.

As just described, to release the shaft 16 from the collet, it is required that the collet sleeve 174 be slid forwardly as by gripping its outwardly flared portion 230 and either pulling back on the tool housing or pulling forward on the sleeve 174 so that there is relative forward sliding movement of the sleeve 174 relative to the inner body 172 which, in turn, causes the cam actuator to engage in the control portion 205 of the retaining spring member 176 to urge the legs 194 and 196 out from the shaft recess 188. Although it is contemplated that the positions of the cooperating portions, i.e. spring control portion 205 and actuator cams 206 and 208, could be reversed so that rearward sliding would release the shaft 16, forward sliding is desirable in that rearwardly directed axial forces on the collet sleeve 174 will not cause inadvertent release of the shaft 16 such as during tool operations. Similarly, because the wire spring legs 194 and 196 are sized close to the height of the abutment walls 200 and 202, accidental release of the shaft 16 should the tool bit be pushed in a rearward direction is also minimized by engagement of the abutment wall 202 with the spring legs 194 and 196 which tends to keep them in place securely holding the tool shaft 16 in the collet irrespective of which way the sleeve 174 is slid for releasing the shaft 16.

As is apparent, the manner in which the shaft 16 is inserted and held in the collet is substantially independent of the manner in which it is released. More specifically, the spring legs 194 and 196 are spread apart by the shaft 16 as it is inserted with the legs 194 and 196 riding against slot walls 178a and 180a, as previously described. As such, the cam actuators 206 or 208 do not engage the spring control portion 205 to achieve the opening of the spring legs 194 and 196 as one of them does for releasing the shaft 16. In other words, during shaft insertion, the spring legs 194 and 96 are opened without operation of the cam actuators 206 and 208.

To reduce the play between the shaft 16 and the bore walls 192a, take-up members 232 can be provided either mounted to the inner body 172 or the shaft 16. In one form, the take-up member 232 is a generally U-shaped wire form support spring 234 which seats in a groove 236 provided behind the circular face flange 182 of the inner body 172 with rounded end portions 238 and 240 projecting into the bore 192 via respective openings 242 and 244 formed in the inner body 172 at opposite ends of the groove 236, as shown in FIGS. 27, 29 and 30. The rounded end portions 238 and 240 are sized and/or configured such that they will not fit in the shaft recess 188. In this manner, the take-up member 232 will not interfere with insertion or removal of the tool bit shaft 16 into or out from the collet assembly 14. However, when the shaft 16 is inserted in the bore 232, the end portions 238 and 240 will resiliently bear against corners of the square shaft 16 to secure the shaft against axial and lateral movement and any rattling against the bore walls 192a.

Figure 33:
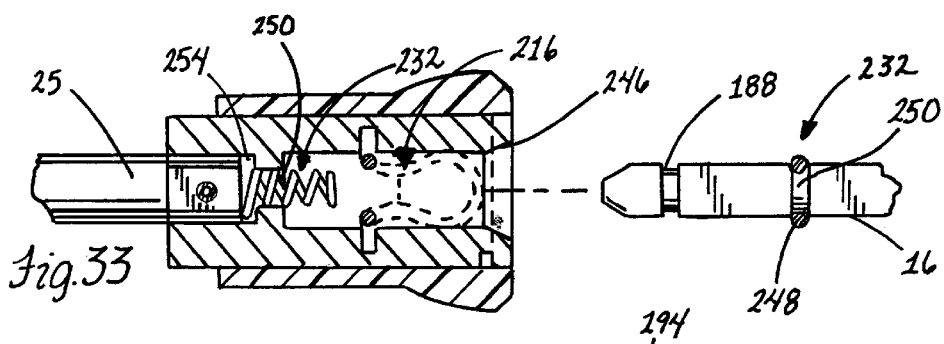
FIG. 33 is a sectional view of the present collet assembly including a compression spring disposed at the rear of the inner body bore and a take-up resilient member on the shaft.
Figure 34:
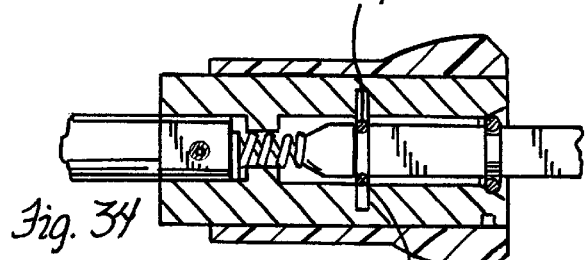
FIG. 34 is a view similar to FIG. 33 showing the shaft inserted and releasably held in the bore with the end of the shaft engaged with the compression spring and the take-up resilient member in a counter-sunk portion of the bore.
Figure 35:
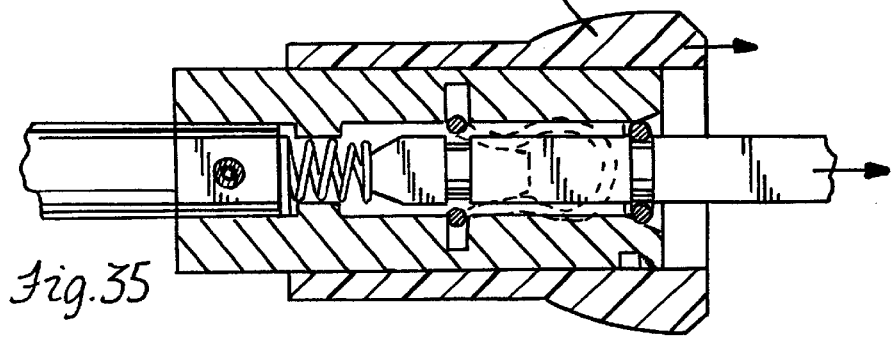
FIG. 35 is an enlarged cross-sectional view similar to FIG. 34 showing the collet outer sleeve slid forwardly to release the leg portions of the retaining spring from the bit shaft recess with the compression spring urging the shaft forwardly out from the bore.
Figure 36:
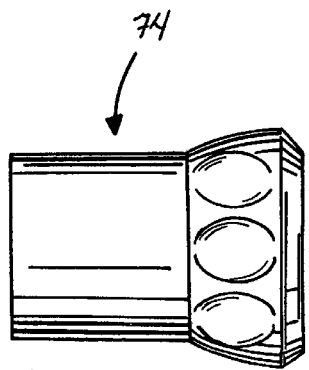
FIG. 36 is a side elevational view of the collet outer sleeve.

Other forms of take-up members 232 are shown in FIGS. 33–35. As shown, the bore 192 preferably has a forward countersunk portion 246. A resilient member in the form of O-ring 248 can be mounted in a recess 250 at a predetermined axial distance from the recess 188. This distance is sized so that with the shaft 16 releasably held in the bore 192 vis-a-vis spring legs 194 and 196 received in recess 188, the O-ring 248 will be tightly received and compressed into the countersunk portion 246 of the bore 192. In this manner, the O-ring 248 interferes with the countersunk portion 246 and acts like a stiff spring or cushion to prevent rattle between the shaft 16 and the bore walls 192a. The O-rings 248 can also be provided in different colors each associated with a specific type of accessory tool bit to provide an indication as to what mode the tool bit is to be used in, i.e. reciprocating, rotary, or both. Alternatively, only two colors of O-rings 248 can be provided where two O-rings 248 are mounted to the shaft 16. If the two colors are different, the bit is for use in either the rotary or reciprocating mode, otherwise O-rings 248 of the same color indicate one mode or the other.

Another take-up member 232 is shown in FIG. 33 in the form of compression spring 250 mounted at the rear end of the bore 192 as by capturing pawl end 252 thereof in a pocket 254 formed in the collet inner body 172 and the forward end of the output shaft 25. The compression spring 250 also serves to ease the removal of the shaft 16 once the collet sleeve 174 is slid forwardly, as is shown in FIG. 35. To this end, once the spring legs 194 and 196 are shifted out from the shaft recess 188 as by sliding of the sleeve 174 forwardly, the compression spring 250 causes the shaft 16 to pop partially out of the bore 192 due to the preload provided on the spring 250 when the shaft 16 is held in the bore 192 with the shaft tapered end 190 engaged with forward coil 254a of the spring 254. The user can then release their grip on the sleeve 174 which is biased back rearwardly by the retaining spring control portion 205 acting on one of the cam actuator members 206 or 208, and then pull the shaft 16 out from the inner body 172 without having the legs 194 and 196 spring back into the recess 188 as can be the situation without the compression spring 250. An additional advantage provided by this method of releasing the shaft 16 is that the compression spring 250 provides visual feedback that the collet sleeve 174 has been shifted forwardly sufficiently to release the shaft 16 in addition to the feel that user normally will get when this occurs as when the compression spring 250 is not utilized.

Another purpose of the compression spring 250 is to alleviate the axial and lateral play between the shaft 16 and the bore walls 192a. Although the compression spring 250 pushes the shaft 16 primarily in the axial direction, given instabilities, the spring 250 will never perfectly balance the shaft 16 such that it stands perfectly center in the bore 192. Accordingly, the shaft will inevitably push up against the bore walls 192a and stay sufficiently securely engaged therewith to eliminate any perceived play and audible rattle.

FIGS. 40–43 depict another form of a collet assembly 14 in accordance with the invention. In this form, the inner body 172 is provided with a front face flange 255 and a rear D-shaped cross-sectional portion 256 which has notches 258 and 260 cut in either side thereof in communication with the bore 262 formed in the body 172. As can be seen, the bore 262 has a rectangular cross-sectional shape and the tool shaft 264 has a similar shape. Instead of a recess 188 similar to shaft 16, the shaft 264 has a pair of notches 266 and 268 on either side thereof adjacent tapered end 270 of the shaft 264. As the shaft 264 is formed from thinner rectangular stock than the square stock shaft 16, it is generally more suitable for lighter-duty applications. The inner body D-shaped portion 256 has a flat 272 to which the retaining spring 274 is mounted by arranging loop portion 276 thereof so that it extends about spring pedestal 278 disposed behind the face flange 255 of the inner member 172. Leg portions 280 and 282 extend into the bore 262 at a predetermined axial position therein via the notches 258 and 260. With the shaft 264 inserted into the bore 262 the spring legs 258 and 260 will be received in the notches 266 and 268 to releasably hold the shaft 264 in the collet, as is shown in FIG. 42. The collet sleeve 174 is similar to previously described sleeve in that it has a wedge-shaped cam actuator 284, although only one such actuator is provided due to the asymmetric construction of the inner body 172 of FIGS. 40–43. The operation to release shaft 264 from its held condition is the same as with the previously described collet where the sleeve 174 is made to undergo forward sliding relative to the inner body 172 to cause the wedge cam member 284 to cammingly engage the spring retaining member 274 to spread the legs 280 and 282 apart from each other and out from the shaft notches 266 and 268 allowing a user to pull the shaft 264 from the bore 262 without interference from the legs 280 and 282.

Figure 44:
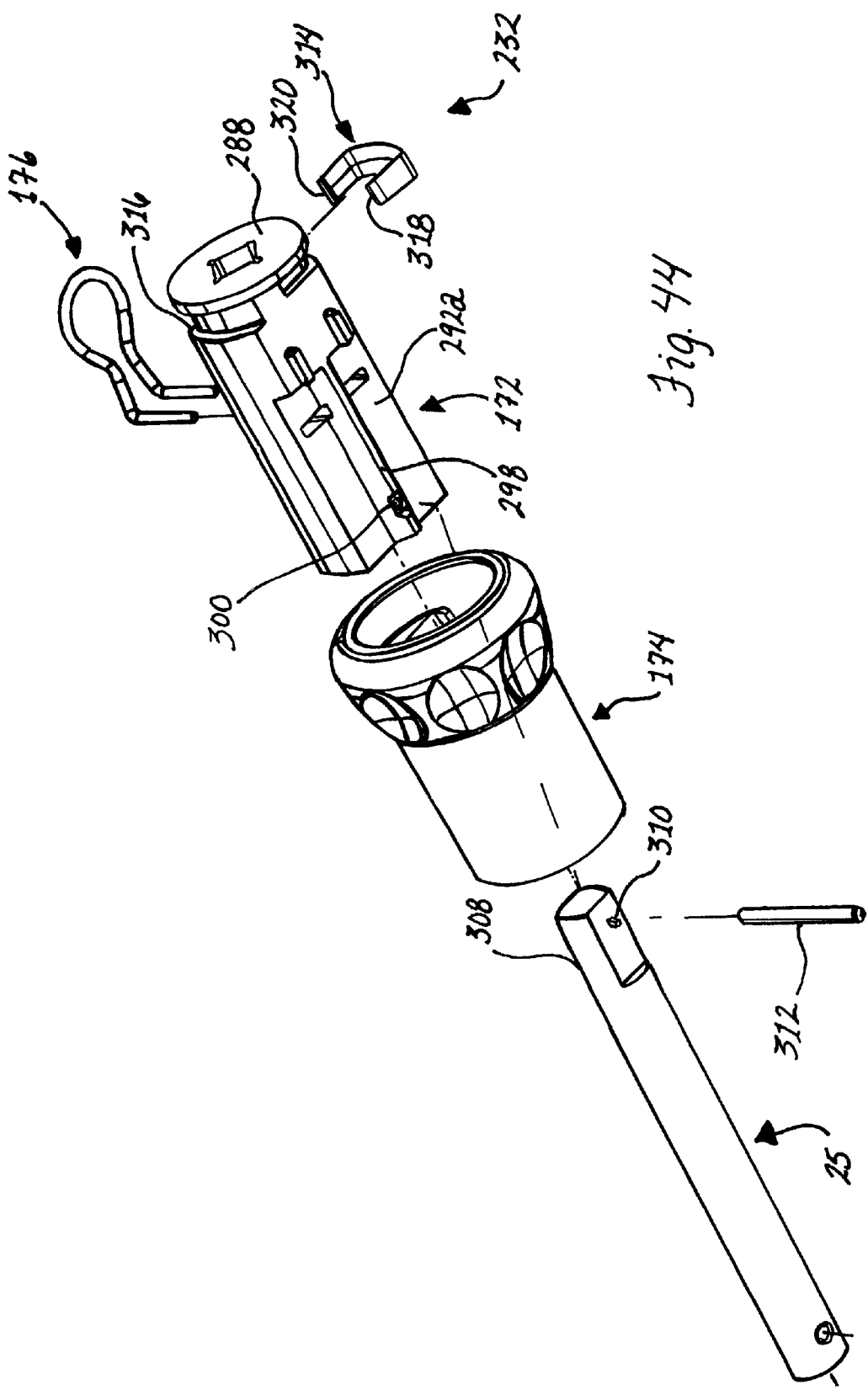
FIG. 44 is an exploded perspective view of a collet assembly similar to that of FIG. 26.

FIGS. 44–49 are directed to a collet assembly similar to that depicted in FIG. 27. Accordingly, the collet assembly as shown in FIG. 44 includes the inner body 172, sleeve 174 and retaining spring 176. The inner body 172 of FIG. 44 also has a substantially square-shaped axial bore 286, as best seen in FIG. 48. The inner body 172 has a circular front face flange 288 and otherwise has a generally rectangular configuration with bowed out ends with flat sides 290 and 292 at the top and bottom thereof Lowered surface portions 290a and 292a are provided with the surface portion 290a allowing the control portion 205 of the spring retaining member 176 to be raised thereover as it rests on inner body raised portion 294, as best seen in FIGS. 45 and 46.

The size and orientation of the axial bore 286 relative to the lowered surface portions 290a and 292a is such that one pair of opposite corners of the bore 286 project beyond the surface portions 290a and 292a so as to create raised generally V-shaped ridges 296 and 298, respectively, thereon, as best seen in FIG. 49. The ridges 296, 298 are centrally disposed on the surface portions 290a and 292a. The slots 178 and 180 for the spring legs 194 and 196 intersect the ridge 296 and ridge 298, as can best be seen in FIGS. 44 and 47. Accordingly, with the legs 194 and 196 extending through the respect slots 178 and 180, the legs 194 and 196 will abut up against the ridge 296 at their upper portions, and they will abut up against the ridge 298 at their lower portions, as can be seen in FIG. 49.

At the rear of the ridges 296 and 298, a through hole 300 is formed extending through the inner body 172 at recessed areas 302 and 304 formed in the ridges 296 and 298. To connect the output shaft 25 to the collet assembly, a generally rectangular-shaped rear portion 306 is provided in the axial bore 286 for receipt of a correspondingly shaped forward portion 308 of the shaft 25. The shaft forward portion 308 also has a through opening 310 so that when the shaft portion 308 is inserted in the bore portion 306, the through openings 300 and 310 are in alignment with each other for receipt of a retainer pin 312 press fit therethrough. The retainer pin 312 extends radially beyond the sleeve 174 closely adjacent there are there of to prevent relative rearward sliding between the inner body 172 and sleeve 174.

The take-up member 232 of FIG. 44 is also of slightly different form than the wire form support spring 234 of FIG. 27 and instead is a band-type spring 314 having a substantially flat cross-sectional configuration. To accommodate the larger band spring take-up member 314, the groove 316 behind face flange 288 is widened over groove 236. The band spring take-up member 314 includes opposed straight end portions 318 and 320 that project into the axial bore 286 for engaging the tool bit shaft 16 to secure the shaft against axial and lateral movement in the bore 286. The straight end portion 318 and 320 extend in the axial direction for a greater distance than the size of the shaft recess 188 so that they will not fit therein and thus will not interfere with insertion or removal of the tool bit shaft 16 into or out from the collet assembly.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A collet assembly for a power tool which releasably receives an end portion of a shaft therein with the shaft having a working element at the opposite end thereof, the collet assembly comprising:

an inner body having an axial bore configured to receive the shaft therein;

an outer collet sleeve slidably mounted over the inner body in a predetermined position relative thereto with the shaft releasably held in the bore;

a resilient member having portions in the bore substantially fixed at a predetermined axial position therein for being received in a recess of the shaft for releasably holding the shaft in the bore; and cooperating portions of the resilient member and collet sleeve which urge the resilient member portions in the bore laterally out therefrom to allow the shaft to be removed from the collet assembly as an incident of relative sliding movement between the collet sleeve and inner body and which urge the sleeve to the predetermined position thereof with the shaft removed from the collet assembly.

2. The collet assembly of claim 1 wherein the cooperating portions comprise a control portion of the resilient member external of the inner body bore, and a cam member inside the collet sleeve with the control portion and cam member having predetermined configurations so that with relative sliding between the sleeve and body the cam member resiliently deforms the control portion from its predetermined configuration causing the resilient member portions in the bore to shift out from the shaft recess.

3. The collet assembly of claim 1 wherein the resilient member comprises a retaining spring having a pair of legs extending into the bore on either side thereof, and the cooperating portions include an arcuate control portion of the spring on the body and a wedge cam member on the collet sleeve adapted to engage the control portion for urging the legs out from the shaft recess as the collet sleeve and inner body undergo relative sliding movement.

4. A collet assembly for a power tool which releasably receives an end portion of a shaft therein with the shaft having a working element at the opposite end thereof, the collet assembly comprising:
   an inner body having an axial bore configured to receive the shaft therein;
   an outer collet sleeve slidably mounted over the inner body;
   a resilient member having portions in the bore at a predetermined axial position therein for being releasably received in a recess of the shaft; and
   cooperating portions of the resilient member and collet sleeve which urge the resilient member portions in the shaft recess out therefrom to allow the shaft to be removed from the collet assembly as an incident of relative sliding movement between the collet sleeve and inner body;
   wherein the resilient member comprises a retaining spring having a pair of legs extending into the bore on either side thereof, the cooperating portions include an arcuate control portion of the spring on the body and a wedge cam member on the collet sleeve adapted to engage the control portion for urging the legs out from the shaft recess as the collet sleeve and inner body undergo relative sliding movement, and
   the arcuate control portion of the retaining spring has a narrow throat portion which opens in a rearward direction and toward the wedge cam member with forward sliding of the collet sleeve relative to the body causing the wedge cam member to urge the spring throat portion apart moving the spring legs out from the shaft recess so that axial forces acting on the sleeve in the rearward direction do not cause the shaft to release from the bore.

5. A collet assembly for a power tool which releasably receives an end portion of a shaft therein with the shaft having a working element at the opposite end thereof, the collet assembly comprising:
   an inner body having an axial bore configured to receive the shaft therein;
   an outer collet sleeve slidably mounted over the inner body;
   a resilient member having portions in the bore at a predetermined axial position therein for being releasably received in a recess of the shaft; and
   cooperating portions of the resilient member and collet sleeve which urge the resilient member portions in the shaft recess out therefrom to allow the shaft to be removed from the collet assembly as an incident of relative sliding movement between the collet sleeve and inner body;
   wherein the resilient member comprises a retaining spring having a pair of legs extending into the bore on either side thereof, the cooperating portions include an arcuate control portion of the spring on the top of the body and a wedge cam member on the collet sleeve adapted to engage the control portion for urging the legs out from the shaft recess as the collet sleeve and inner body undergo relative sliding movement, and
   the wedge cam member has opposite ramp surfaces which progressively force opposite sections of the spring control portion apart as the sleeve and body are slid relative to each other from a predetermined operating position and so that the sleeve and body are biased back toward the predetermined operating position by the opposite sections of the spring control portion acting on the ramp surfaces.

6. The collet assembly of claim 1 wherein the resilient member is a wire form spring and the resilient member portions in the bore are wire leg portions with the wire form spring having a small cross-sectional diameter to minimize space requirements therefor in the assembly.

7. The collet assembly of claim 6 where the inner body has a pair of slots in communication with the bore for receiving the wire leg portions therethrough and into the bore, the slots having a predetermined width approximately the same as the spring diameter.

8. The collet assembly of claim 1 including a take-up member mounted to one of the inner body and shaft for minimizing play between the bore of the body and shaft with the resilient member portions received in the shaft recess.

9. In combination, a power tool for driving a working element, the working element mounted to an elongate shaft thereof, the combination comprising:
   a housing of the power tool having a forward end;
   a collet assembly mounted at the forward end of the housing;
   an inner body of the collet assembly having an axial bore configured to receive the shaft therein;
   an outer collet sleeve slidably mounted over the inner body;
   a recess of the shaft having abutment walls extending normal to the length of the shaft;
   a retaining member disposed at a predetermined position in the bore and received in the recess of the shaft with the retaining member confined by one of the abutment walls to prevent the shaft from being pulled out of the bore; and
   an actuator for the retaining member operated by sliding of the collet sleeve to cause the retaining member to shift out from the recess and clear the abutment wall for allowing the shaft to removed from the bore, the actuator includes a first portion on the collet sleeve and a second portion mounted to the inner body with the portions having predetermined positions relative to each other with the retaining member in the shaft recess so that sliding of the collet forwardly away from the tool housing causes the portions to engage each other for shifting the retaining member out from the recess.

10. The combination of claim 9 wherein the bore includes a countersunk portion and the shaft includes a resilient member mounted thereabout at a predetermined position from the recess of the shaft so that with the retaining member in the recess the resilient member will be tightly received in the bore countersunk portion to minimize lateral and axial movement of the shaft in the bore during tool operations.

11. The combination of claim 9 including a biasing member in the bore disposed at a rear end thereof so that with the shaft received and held in the bore by the retaining member, the shaft will be biased out from the bore to provide for one-handed release of the shaft by sliding of the collet sleeve with one hand to operate the actuator and releasing the collet sleeve so that the shaft is not held in the bore by the retaining member.

12. The combination of claim 9 including a resilient member mounted to the inner body so that portions of the resilient member project into the bore for gripping the shaft inserted and held in the bore by the retaining member in the shaft recess to minimize axial and lateral movement of the shaft in the bore during tool operations.

13. The combination of claim 12 wherein the portions are disposed forwardly of the retaining member in the bore and are sized so that they do not fit in the recess of the shaft.

14. The combination of claim 9 wherein the retaining member comprises a wire form spring having leg portions projecting into the bore at the predetermined position therein, and the actuator includes a control portion of the wire form spring external of the bore and a cam actuator portion of the sleeve which cams and deflects the control portion as the sleeve slides relative to the inner body for shifting the leg portions out from the shaft recess.

* * * * *